United States Patent Office 3,475,417
Patented Oct. 28, 1969

---

3,475,417
6,1′-SPIROCYCLOPROPYL PREGNANES
Norman A. Nelson, Galesburg, Mich., assignor to The Upjohn Company, Kalamazoo, Mich., a corporation of Delaware
No Drawing. Filed Mar. 24, 1965, Ser. No. 442,520
Int. Cl. C07c *173/10, 173/00, 169/34*
U.S. Cl. 260—239.5                                                        26 Claims This invention relates to novel 6,1′-spirocyclopropyl compounds of the pregnane series having the full cortical side chain and to processes for the production thereof. More particularly it relates to novel 17α,21-dihydroxyspiro[pregn-4-ene-6,1′-cyclopropanes], to the 21-acylates thereof, to novel derivatives thereof, to novel intermediates and to processes for the production of the compounds of this invention.

The novel compounds of this invention are chemically represented by structures 1, 2 and 3:

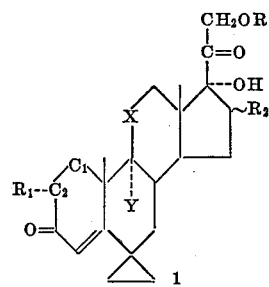

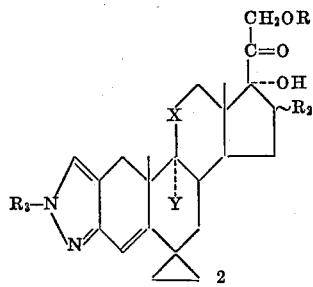

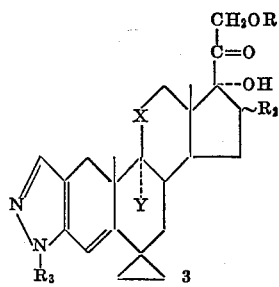

wherein R is hydrogen or acyl; $R_1$ is hydrogen or methyl; $R_2$ is hydrogen, methyl, fluorine, chlorine or methoxy; $R_3$ is hydrogen, acyl, alkyl, cycloalkyl, aralkyl, aryl, heterocyclic nucleus, or substituted derivatives thereof; X is $>CH_2$, $>C=O$, or

Y is hydrogen or fluorine; —$C_1$—$C_2$— is the divalent radical —$CH_2CH_2$— or —CH=CH—; and wherein X is $>CH_2$, Y is limited to hydrogen.

The novel compounds represented by Formulas 1, 2 and 3, above, are anti-inflammatory agents and are useful in the treatment of arthritis and related diseases; various inflammatory conditions of the skin, respiratory tract, bones and internal organs; contact dermatitis and allergic reactions.

The novel compounds of Formulas 1, 2 and 3 are useful in the treatment of animals, including mammals and birds, and are particularly useful in the treatment of humans and valuable domestic animals. They can be administered in conventional dosage forms, such as pills, tablets, capsules, syrups, or elixirs for oral use, or in liquid forms which are suitable for injectable products. They can also be administered topically in the form of ointments, creams, lotions, and the like, with or without coacting antibiotics, germicides or other materials forming advantageous combinations therewith.

In the process of this invention a 6α-(2′-hydroxyethyl) group is first introduced into a steroid having a protected cortical side chain by one of three alternative routes designated hereinafter as Routes A, B and C. Route A is preferred in the practice of this invention. These routes and the compounds produced are represented by the following reaction schemes:

Routes A and B                    Route C

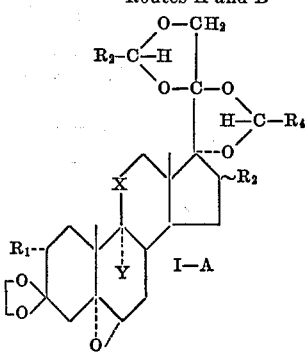
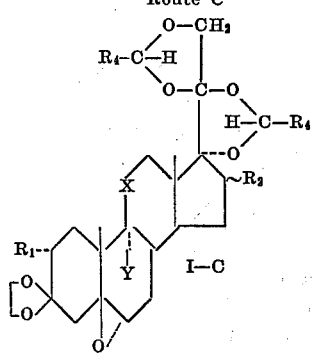

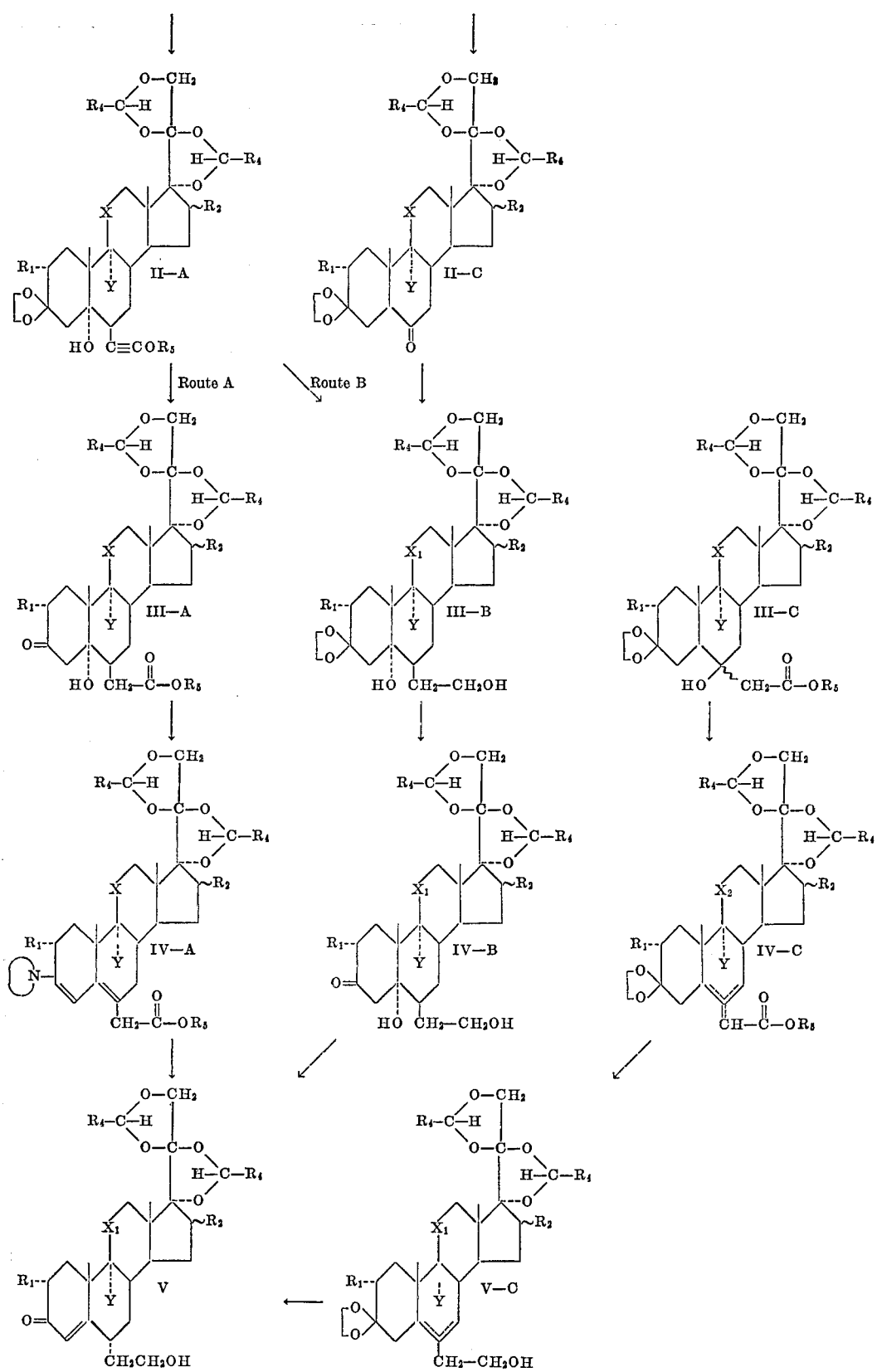
wherein R, $R_1$, $R_2$, X and Y have the same meanings as previously given; $R_4$ is hydrogen or alkyl; $R_5$ is alkyl; $X_1$ is $>CH_2$ or
$X_2$ is $>CH_2$ or $>C=O$; the symbol
$$\left\langle \begin{array}{c} O- \\ O- \end{array} \right.$$
represents an alkylenedioxy radical of the formula
$$\left\langle \begin{array}{c} O-(CH_2)_n \\ O-CH-R_4 \end{array} \right.$$

wherein $n$ is the integer 1 or 2 and $R_6$ is hydrogen or alkyl; the symbol

is a cyclic amino radical; and wherein when X, $X_1$ and $X_2$ are $>CH_2$, Y is restricted to hydrogen.

The term "acyl" means the acyl radical of an organic carboxylic acid preferably a hydrocarbon carboxylic acid, of 1 to 16 carbon atoms, inclusive. The term "alkyl" means an alkyl radical of 1 to 8 carbon atoms, inclusive, such as methyl, ethyl, propyl, butyl, amyl, hexyl, heptyl, octyl and isomeric forms thereof. The term "cycloalkyl" means a cycloalkyl radical of 3 to 8 carbon atoms, inclusive, such as cyclopropyl, cyclobutyl, cyclopentyl, cyclohexyl, cycloheptyl, and cyclooctyl. The term "aralkyl" means an aralkyl radical of 7 to 13 carbon atoms, inclusive, such as benzyl, phenethyl, phenylpropyl, benzhydryl, and the like. The term "aryl" means an aryl radical of 6 to 12 carbon atoms, inclusive, such as phenyl, tolyl, xylyl, naphthyl, diphenyl, halophenyl, nitrophenyl, and the like. The term "heterocyclic nucleus" means a ring system of from 4 to 9 carbon atoms, inclusive, containing at least one substituent in the ring selected from the group consisting of nitrogen, sulfur and oxygen, such as 2-pyridyl, 3-pyridyl, 2-pyrimidyl, 3-pyrimidyl, 3-quinolyl, 4-quinolyl, 2-morpholinyl, 2-thiomorpholinyl, 2-pyranyl, 3-thiophenyl, 2-furyl, 2-indolyl and the like. The term "cyclic amino radical" means a saturated 5 to 9 ring atom cyclic amino radical and is inclusive of pyrrolidino, alkylpyrrolidino such as 2-methylpyrrolidino, 2,2-dimethylpyrrolidino, and the like, piperidino, alkylpiperidino such as 2 - methylpiperidino, 3 - methylpiperidino, 4,4 - dimethylpiperidino and the like, piperazino, alkylpiperazino such as 1 - methylpiperazino, 3 - methylpiperazino, 4 - methylpiperazino and the like, morpholino, alkylmorpholino such as 2-methylmorpholino, 3-methylmorpholino and the like, hexamethyleneimino, homomorpholino, homopiperidino, thiamorpholino, octamethyleneimino, and the like.

The $5\alpha,6\alpha$-epoxides and $5\beta,6\beta$-epoxides of Formulas I–A and I–C employed as starting materials in the process of this invention are for the greater part known or can be prepared by known methods such as those set forth below and in the preparations appended hereto. Thus the starting materials of Formulas I–A and I–C can be prepared by treating a compound of the formula:

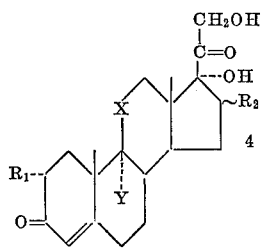

wherein $R_1$, $R_2$, X and Y have the same meanings as previously given, with a suitable aldehyde such as formaldehyde, acetaldehyde, propionaldehyde, butyraldehyde, valeraldehyde, and the like, in the presence of a strong acid in the manner disclosed in U.S. Patent 2,888,456 to produce the corresponding 17,20:20,21 - bisalkylidenedioxy steroid. Formaldehyde or a convenient source of formaldehyde is preferred to obtain the corresponding 17,20:20, 21-bismethylenedioxy steroid.

The bisalkylidene dioxy compounds thus obtained are then ketalized at the 3-position with ketalizing agents in accordance with methods known in the art to produce the corresponding $\Delta^5$-3-alkylenedioxy compounds, by reacting the said 3-ketone with an alkane-1,2-diol or alkane-1,3-diol such as ethylene, propylene, trimethylene, 1,2-butylene, 2,4-pentylene, 4-methyl-1,2-pentylene, 6-methyl-1,3-hexylene, 1,2-heptylene, 3,4-heptylene, 1,2-octylene glycol, and the like; preferably in an organic solvent such as benzene, toluene, xylene, methylene chloride, and the like, and in the presence of an acid catalyst such as p-toluenesulfonic acid, benzenesulfonic acid and the like. The reaction is conducted at a temperature between about 20° C. and about 200° C., preferably between about 70° C. and about 120° C. The time required for the reaction is not critical and may be varied between about one and 48 hours, depending on the temperature, the ketalizing agent and catalyst employed.

The $\Delta^5$-3-alkylenedioxy compounds thus obtained are then epoxidized at the 5,6-positions with a per-acid such as perbenzoic, peracetic or perphthalic in accordance with methods known in the art [Campbell et al., J. Am. Chem. Soc., 80, 4717 (1958)] to produce the corresponding $5\alpha,6\alpha$- and $5\beta,6\beta$-epoxides of Formulas I–A and I–C. The reaction is conducted in an inert organic solvent such as chloroform, methylenechloride, benzene, tetrahydrofuran, ether, diglyme and the like at temperatures from 0° to 100° C. for from 1 to 80 hours. Formation of the oxides is accomplished by intimately contacting the reactants in an inert solvent medium at about room temperature. When the reaction is complete the excess per-acid is removed and the desired 5,6-epoxides are separated or recovered by conventional methods such as chromatography and/or crystallization.

Route A

In carrying out the process of Route A of this invention a $5\alpha,6\alpha$-epoxy-3-alkylenedioxy-17,20:20,21-bisalkylidenedioxy steroid of Formula I–A is reacted with an alkoxyacetylene magnesium halide, preferably in alkoxyacetylene magnesium halide in which the alkyl substituent contains from 1 to 4 carbon atoms, inclusive, and more particularly ethoxyacetylene magnesium bromide in accordance with the procedures disclosed in U.S. Patent 3,088,946 to produce the corresponding $6\beta$ - ethynyl - $5\alpha$-hydroxy compound of Formula II–A.

The $6\beta$-ethynyl-$5\alpha$-hydroxy compound is then subjected to hydrolysis in the presence of an acid such as sulfuric, hydrochloric, hydrobromic, perchloric, p-toluenesulfonic, oxalic, acetic and the like in the presence of an inert organic solvent, advantageously a solvent miscible with water such as tetrahydrofuran, acetone, a lower-alkanol, 1,2-dimethoxyethane, dioxane, dimethylformamide and the like. The hydrolysis can be carried out within a relatively wide temperature range such as from 0 to 50° C. or higher, however the hydrolysis is advantageously conducted at room temperature, i.e., of the order of 25° C. or at moderately elevated temperatures. The time required for completion of the reaction varies with the temperature employed, a period of from about 3 to 8 hours is generally sufficient at the preferred temperature range. There is thus produced the corresponding 3-oxo-$6\beta$-acetic acid alkyl ester of Formula III–A. The 3-oxo-$6\beta$-acetic acid alkyl ester is then reacted with a secondary cyclic amine, pyrrolidine is preferred, in accordance with methods known in the art, e.g., U.S. Patent 3,070,612, to produce the corresponding 3-enamine (IV–A), which is then treated with a reducing agent to produce the corresponding $6\beta$-(2'-hydroxyethyl)-3-enamine (when an 11-oxo group is present at the 11-position it is concomitantly reduced to an $11\beta$-hydroxy group) which gives on hydrolysis with an aqueous acid or a base the corresponding $6\alpha$-(2'-hydroxyethyl)-pregn-4-en-3-one of Formula V. Suitable reducing agents are lithium aluminum hydride, potassium borohydride, diborane, di-isobutyl aluminum hydride, and the like. The preferred reducing agent is lithium aluminum hydride in tetrahydrofuran, ether-benzene, ether, combinations thereof and the like. The reaction is preferably conducted at reflux temperature and a period of 1 to 4 hours is generally sufficient for completion of the reaction.

Route B

In carrying out the process of Route B of this invention a 5α,6α-epoxy-3-alkylenedioxy-17,20:20,21-bisalkylidenedioxy compound of Formula I–A is reacted with an alkoxyacetylene-magnesium halide in the same manner as disclosed in Route A, above, to produce the corresponding 6β-ethynyl-5α-hydroxy compound of Formula II–A. The latter compound is then treated with an organic carboxylic acid, preferably a liquid hydrocarbon carboxylic acid containing from 1 to 6 carbon atoms, inclusive, such as formic, acetic, propionic, butyric, isobutyric, and the like. Glacial acetic acid is particularly advantageous. The reaction can be carried out in the presence of an inert solvent, such as ether, methylene chloride, benzene, toluene and the like, or the acid can act as the solvent for the steroid. The reaction is carried out at temperatures from 0 to 80° C., with a temperature of about 25° C. being preferred. The time required for completion of the reaction is from about 1 to 48 hours, depending on the acid and temperature employed. The product thus obtained is separated from the reaction medium by conventional methods, for example, by diluting the reaction mixture with an excess of cold aqueous base, e.g., sodium or potassium hydroxide, and extracting the product with a water-immiscible organic solvent such as ethyl acetate, methylene chloride, toluene, benzene, Skellysolve B isomeric hexanes and the like. The extract thus obtained is then washed and dried and the solvent removed by evaporation or distillation.

The product thus obtained is then treated with a reducing agent, lithium aluminum hydride is preferred, in the same manner as disclosed in Route A, above, in the conversion of the compounds of Formula IV–A to the compounds of Formula V. There are thus obtained the corresponding 6β - (2′-hydroxyethyl) - 5α-hydroxy-3-alkylenedioxy compounds of Formula III–B. Likewise as in Route A when the 11-oxo group is present it will be reduced to an 11β-hydroxy group.

The compounds of Formula III–B are then subjected to acid hydrolysis in accordance with known methods, for example, under mildly acidic conditions at moderate temperatures to remove the 3-alkylenedioxy group, giving the corresponding 3-oxo compounds of Formula IV–B.

The compounds of Formula IV–B are then subjected to dehydration with a base to produce the corresponding 6α-(2′-hydroxyethyl)-pregn-4-en-3-ones of Formula V. Bases which can be used include sodium or potassium hydroxide, alkali metal alkoxides, e.g., sodium methoxide or ethoxide, an alkali earth hydroxide such as barium hydroxide or calcium hydroxide, and the like, in the presence of an inert organic solvent such as methanol, ethanol, dioxane, or other suitable solvents. The alkaline reaction mixture can be allowed to react slowly at room temperature or the mixture can be brought to reflux temperature and refluxed until the reaction is complete, 1 to 30 minutes is usually sufficient.

Route C

In Route C of this invention when an 11-oxygenated compound is used as starting material the 11-oxo compound is preferably employed because dehydration in a later step results in dehydration of the 11-hydroxy group when present giving the corresponding $\Delta^{9,11}$-compound.

In carrying out the process of Route C of this invention a 5β,6β-epoxy-3-alkylenedioxy-17,20:20,21-bisalkylidenedioxy compound of Formula I–C is dissolved in an inert organic solvent such as benzene, toluene, ethyl ether and the like and treated with boron trifluoride-ethyl ether under anhydrous condtions. The reaction is advantageously carried out at room temperature, i.e., about 25° C. A reaction time of from 1 to 8 hours is usually sufficient for completion of the reaction. The product thus obtained is then separated from the reaction mixture by conventional methods, e.g., the reaction mixture is poured into water and the organic layer separated, washed, dried and concentrated. The product is then treated with a base, in the same manner as disclosed in Route B, above, for the dehydration of the compounds of Formula IV–B to the compounds of Formula V, to give the corresponding 6-oxo compounds of Formula II–C.

Alternatively the 6-oxo compounds of Formula II–C can be prepared by treating a 5β,6β-epoxide of Formula II–C or the corresponding 5α,6α-epoxides or a mixture of 5α,6α-and 5β,6β-epoxides with formic acid followed by treatment with a base in accordance with the procedures disclosed by Fried et al., J. Am. Chem. Soc., 81, 1235 (1959).

The compounds of Formula II–C are then subjected to a Reformatsky reaction in accordance with methods well known in the art, see for example, Organic Reactions, vol. I, pp. 14, 15 and 16, John Wiley and Sons, Inc., New York, N.Y. Thus, the compounds of Formula II–C are treated with an alkyl α-haloacetate such as methylbromoacetate, or other α-haloester, wherein the alkyl substituent contains from 1 to 8 carbon atoms, inclusive, and the halo substituent is bromine, chlorine, or iodine, in the presence of zinc or magnesium, and in a suitable solvent such as ethyl ether, butyl ether, benzene, toluene, xylene, mixtures thereof, and the like. There is thereby produced the corresponding 6-carboalkoxymethyl-6-hydroxy compounds of Formula III–C.

The compounds of Formula III–C wherein X is hydroxy are subjected to oxidation in accordance with methods well known in the art e.g., with chromic acid, to obtain the corresponding 11-oxo compounds before carrying out the next step.

The compounds of Formula III–C wherein X=>CH₂ or >C=O are then subjected to dehydration with a dehydrating agent for example, thionyl chloride or N-bromoacetamide in pyridine followed by sulfur dioxide, phosphorous oxychloride and the like to produce the corresponding compounds of Formula IV–C, which comprises a mixture of three isomeric forms, namely, the pregn-5-ene-6-acetic acid alkyl ester, the 5α-pregn-6-ene-6-acetic acid alkyl ester and the 5α-pregnane-$\Delta^{6,\alpha}$-acetic acid alkyl ester. The isomeric mixture thus obtained, can be used in the next step without separation into its various components or the isomers especially the $\Delta^{6,\alpha}$-isomer can be separated and purified by conventional methods such as chromatography and crystallization.

The compounds of Formula IV–C are then treated with a reducing agent, lithium aluminum hydride is preferred, in the same manner as disclosed in Route A, above, for the conversion of the compounds of Formula IV–A to the compounds of Formula V to give the compounds of Formula V–C, which comprises a mixture of two isomeric forms of the corresponding 6-(2′-hydroxyethyl) compounds, namely, the corresponding 6-(2′-hydroxyethyl)-pregn-5-ene and the corresponding 6-(2′-hydroxyethyl)-5α-pregn-6-ene.

The compounds of Formula V–C are then subjected to hydrolysis to remove the 3-alkylenedioxy group in accordance with known methods, such as disclosed in Route B, above, for the hydrolysis of the compounds of Formula III–B to the compounds of Formula IV–B. There are thus obtained the corresponding 6α-(2′-hydroxyethyl)-pregn-4-en-3-ones of Formula V and 6-(2′-hydroxyethyl)-pregn-6-ene-3-ones as by products. The compounds of Formula V and the corresponding Δ⁶-compounds are recovered from the reaction mixture by conventional methods such as chromatography and/or crystallization.

The compounds of Formula V obtained by Routes A, B and C, above, are then converted to the 6-1′-spirocyclopropanes of this invention as illustrated by the following reaction scheme:

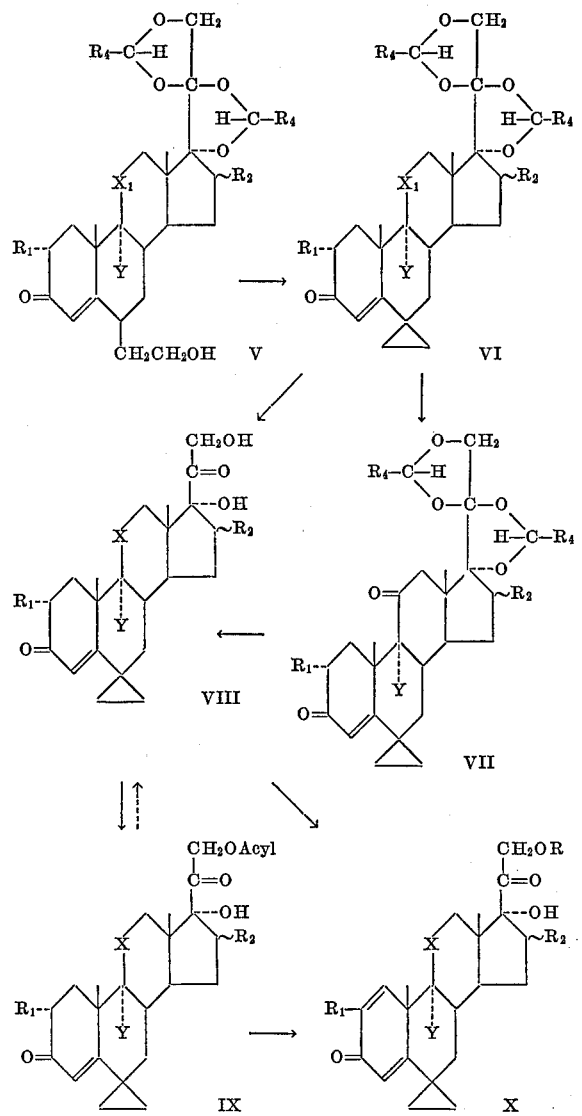

wherein Acyl, R, R₁, R₂, R₄, X, X₁ and Y have the same meanings as previously given.

The 6α-(2′-hydroxyethyl) compounds of Formula V are treated with an organic sulfonic acid halide, preferably a hydrocarbon sulfonic acid halide containing from 1 to 12 carbon atoms, inclusive, generally in the presence of pyridine with or without co-solvents, such as methylene chloride, tetrahydrofuran, benzene, toluene, and the like, in accordance with the procedure disclosed in U.S. Patent 3,105,083, to produce the corresponding 6α-(2′-organic sulfonyloxyethyl) derivative. Illustrative of organic sulfonic acid halides which can be employed are the acid halides of saturated aliphatic sulfonic acids, such as methane sulfonic, ethanesulfonic, propanesulfonic, butanesulfonic, pentanesulfonic, hexanesulfonic, nonanesulfonic, dodecanesulfonic, 2-propanesulfonic, 2-butanesulfonic, 2-pentanesulfonic, 2-octanesulfonic, tertiarybutanesulfonic; saturated cycloaliphatic sulfonic acids such as cyclopentanesulfonic and cyclohexanesulfonic; aralkyl sulfonic acids such as phenylmethanesulfonic and phenylethanesulfonic; and aryl sulfonic acids such as benzenesulfonic, o-toluenesulfonic, p-toluenesulfonic, o-bromobenzenesulfonic, p-bromobenzenesulfonic, o-chlorobenzenesulfonic, p-chlorobenzenesulfonic, o-, m-, p-nitrobenzenesulfonic, anisole-2-sulfonic, anisole-4-sulfonic, and the like. The 6α-(2′-organic sulfonyloxyethyl) derivative of compound V thus obtained can be separated from the reaction medium by conventional methods as hereinbefore disclosed and used directly in the next step or it can be further purified by chromatography or crystallization.

The 6α-(2′-sulfonyloxyethyl) compound is then subjected to a displacement reaction under basic conditions to effect ring closure at the 6-position. Ring closure is effected under a wide range of conditions and with a wide variety of bases. Illustrative of bases which can be used are alkali metal alkoxides such as potassium tert-butoxide, sodium methoxide, lithium ethoxide, and the like, sodium or potassium hydroxide in alcohols or aqueous alcohols, secondary amines in alcohols such as pyrrolidine in methanol, alkali earth hydroxides such as barium or calcium hydroxide, and the like. The reaction is advantageously conducted in an organic solvent such as an alcohol, e.g., methanol, ethanol, propanol, isopropanol, butanol and tert-butanol; tetrahydrofuran, dioxane or other suitable solvent. When an alkali metal alkoxide is used the reaction is preferably conducted using the corsponding 17,20:20,21 - bisalkylidenedioxyspiro[pregn - 4-en-6,1′-cyclopropane]-3-one of Formula VI.

Substituents other than sulfonyloxy such as chlorine, bromine, iodine quaternary ammonium ions and the like can be used effectively in the displacement reaction. These substituents can be introduced onto the 6α-(2′-hydroxyethyl) side chain in accordance with known methods.

The compounds of Formula VI wherein X₁ is

can be oxidized by known methods, for example, with chromic acid in a solvent such as pyridine, acetone and the like to give the corresponding 11-keto compounds of Formula VII.

The compounds of Formulae VI and VII thus obtained are then subjected to hydrolysis with an aqueous organic acid such as 60% formic acid or 50% acetic acid, in accordance with known methods, see for example, Djerassi, Steroid Reactions, Holden-Day Inc., San Francisco, page 60 (1963), to remove the bisalkylidenedioxy moiety, giving the corresponding 17α,21-dihydroxyspiro [pregn-4-en-6,1′-cyclopropane]-3,20-diones of Formula VIII.

The compounds of Formula VIII can be acylated to give the corresponding compounds to Formula IX in accordance with methods known in the art for acylating 21-hydroxy groups, for example, by reaction with the selected acid anhydride or acid halide and by reaction with an acid in the presence of an esterification catalyst. Acylating agents which can be employed in the preparation of the above acylates are organic carboxylic acids, particularly hydrocarbon carboxylic acids containing from 1 to 16 carbon atoms, inclusive, preferably acid anhydrides or halides thereof. Illustrative of hydrocarbon carboxylic acids employed in the formation of the acylates of this invention, include saturated and unsaturated aliphatic acids and aromatic acids such as acetic, propionic, butyric, isobutyric, tert.-butylacetic, valeric, isovaleric, caproic, caprylic, decanoic, dodecanoic, palmitic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids and the like, and the anhydrides and halides thereof.

The compounds of Formulae VIII and IX, can be dehydrogenated at the 1,2-position by fermentative or chemical dehydrogenation to give the corresponding compounds of Formula X. Fermentative dehydrogenation comprises the use of microorganisms such as Septomyxa, Corynebacterium, Fusarium, and the like, under fermentation conditions well known in the art (e.g., U.S.

2,602,769, 2,902,410 and 2,902,411). Where Septomyxa is used to effect the dehydrogenation it is found to be advantageous to use with the substrates and medium a steroid promoter. The free alcohols are usually employed as starting material for the fermentative dehydrogenation process. However, the corresponding 21-acylates can be used. In these cases the 21-ester group is generally hydrolyzed during the fermentation process giving the corresponding free alcohol (X). The alcohols can be acylated in the same manner as previously disclosed for acylating the corresponding $\Delta^4$-compounds. Chemical dehydrogenation can be carried out with selenium dioxide according to known procedures, see for example, Meystre et al., Helv. Chim. Acta, 39, 734 (1956) or with 2,3-dichloro-5,6-dicyano-1,4-benzoquinone in a suitable organic solvent such as dioxane or benzene, see for example, Djerassi, Steroid Reactions, Holden-Day Inc., San Francisco (1963) p. 232. The 21-acylates are generally preferred as starting materials in the selenium dioxide dehydrogenation reaction giving the corresponding $\Delta^{1,4}$-compounds of Formula X. The 21-acylates thus obtained can be saponified, if desired, by methods known in the art to give the corresponding 21-free alcohols.

The [3,2-c]pyrazoles of this invention can be prepared from the compounds of Formulae VI and VII wherein $R_1$ is hydrogen (represented collectively as Formula XI) as shown by the following reaction scheme:

wherein R, $R_2$, $R_3$, $R_4$, X and Y have the meaning previously given.

The pyrazoles of Formulae XIII and XV are [3,2-c]-pyrazoles whereas those of Formulae XIV and XVI are [2,3-d]-pyrazoles.

The compounds represented by Formulae XIII and XIV, and XV and XVI wherein $R_3$ is hydrogen undergo rapid equilabration in solution. Hereinafter, for the sake of simplicity, these resulting mixtures of [2,3-d] and [3,2-c] pyrazoles will be referred to as [2,3-d] pyrazoles.

The pyrazoles of this invention are prepared in accordance with procedures well known in the art, for example, by substituting a compound of Formula XI (composite of the compounds of Formulae VI and VII, wherein $R_1$ is hydrogen) as starting material in the procedure disclosed in U.S. Patent 3,116,287 or 3,067,194. For example a compound of Formula XI is treated with an alkyl formate and sodium hydride in an inert atmosphere to produce the corresponding 2-hydroxymethylene compound of Formula XII. The 2-hydroxymethylene compound, thus produced, is then treated with diazomethane in an organic solvent such as ether, tetrahydrofurane and the like, to give the corresponding 2-alkoxymethylene derivative.

The selected 2-hydroxymethylene compound (XII) or a 2-alkoxymethylene derivative thereof, is then reacted

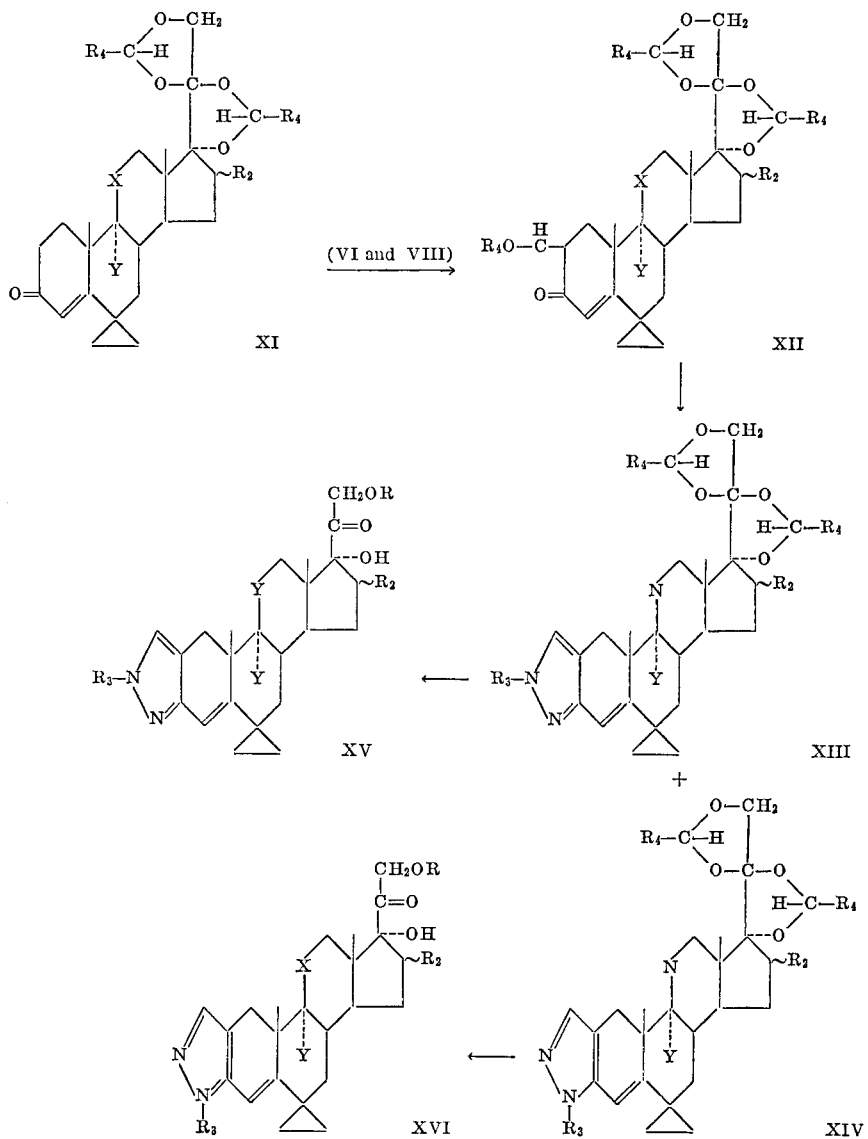

with hydrazine or a monosubstituted hydrazine to give the corresponding pyrazoles of Formulae XIII and XIV. Representative monosubstituted hydrazines which can be used to prepare the compounds of Formulae XIII and XIV are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, 2-hydrazinopyrimidine; 2-hydrazinothiophene and 3-hydrazinothiophene; aralkylhydrazines such as benzylhydrazine and phenylethylhydrazine.

When the compounds of Formula XI wherein Y is halogen, and X is an oxygen containing substituent, are used as starting materials in the above sequence of reactions of the 11-oxo compounds (wherein X is >C=O) are preferred over the 11-hydroxy compounds. There is thereby obtained the corresponding compounds of Formulae XIII and XIV, wherein X is >C=O and Y is halogen, these 11-oxo-9α-halo compounds can be reduced to the corresponding 11β-hydroxy-9α-halo compounds by known methods, e.g., with sodium borohydride.

The compounds of Formulae XIII and XIV thus obtained, are then treated with an aqueous organic acid in the same manner as hereinbefore disclosed, e.g., with 60% aqueous formic acid to remove the 17,20:20,21-bisalkylidenedioxy moiety. There is thereby obtained the corresponding compounds of Formulae XV and XVI, wherein R is hydrogen. The latter compounds can be acylated at the 21-position in accordance with known methods, for example, as hereinbefore disclosed for the acylation of the compounds of Formulae VII to IX, to give the compounds of Formulae XV and XVI, wherein R is acyl. When $R_3$ is hydrogen the N-acyl 21-acylates will be concomitantly produced giving compounds wherein the acyl groups orient at R and $R_3$ are the same.

Acyl groups present at R and/or $R_3$ can be removed by known methods, for example, by treating the compound with sodium hydroxide in methanol, aqueous alcoholic potassium bicarbonate and the like, at room temperature to give the compounds of Formulae XV and XVI, wherein R and $R_3$ are hydrogen.

N-acyl groups present at $R_3$ can be selectively removed by treatment with an aqueous organic acid such as formic acid or acetic acid. The N-unsubstituted 21-acylates thus obtained can then be reacylated in the same manner as previously disclosed to give compounds of Formulae XV and XVI wherein the acyl group at R and $R_3$ are different.

All of the compounds embraced by Formulae IA through V, IB through V, IC through V and V through XVI can be isolated from their reaction mixtures by conventional means, for example, when a water-miscible solvent is used, by pouring the reaction mixture into water, and separating the resulting precipitate by filtration, when a water-immiscible solvent is used the reaction mixture can be diluted with water and the product can be recovered in the solvent, the water layer can be further extracted with additional solvent, either the same solvent or another suitable solvent, solvents which can be used include, for example methylene chloride, ethyl acetate, chloroform, Skellysolve B (hexanes), benzene, toluene, xylene, ethers, mixtures thereof, e.g., Skellysolve B-methylene chloride, and the like. When water is used as the reaction medium such as in the bioconversion process the product can be extracted with a water-immiscible solvent such as those listed above.

Additional purification of the products can be accomplished by conventional methods, for example, the elution chromatography from an adsorbent column with a suitable solvent such as acetone, methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

The following preparations and examples illustrate the best mode contemplated by the inventor for carrying out his invention, but are not to be construed as limiting the scope thereof.

PREPARATION 1

5α,6α-epoxy- and 5β,6β-epoxy-3-ethylenedioxy-17,20:20, 21-bismethylenedioxypregnane-11-one (I–A and I–C)

To 100 g. of 17α,21-dihydroxypregn-4-ene-3,11,20-trione (cortisone) in 5 l. of chloroform was added 2 l. of 40% aqueous formaldehyde and 2 l. of concentrated hydrochloric acid. The mixture was stirred vigorously at room temperature (about 25° C.) for a period of about 72 hours. The aqueous phase was then made alkaline with aqueous sodium hydroxide, separated and extracted with chloroform. After washing with sodium bisulfite solution chloroform was evaporated to give 137 g. of crystalline residue which was recrystallized from acetone and methanol to give 17,20:20,21-bismethylenedioxy-4-pregnene-3,11-dione, M.P. 253–259° C.

The poduct thus obtained was dissolved in benzene and 350 ml. of ethylene glycol and 1.4 g. of p-toluenesulfonic acid was added. The resulting mixture was then refluxed for about 15 hours with continuous removal of water. The mixture was then cooled to room temperature and washed successively with water, sodium bicarbonate and again with water. The organic layer was separated, dried over magnesium sulfate and concentrated to dryness in vacuo. Trituration of the resulting residue with ethyl ether gave substantially pure 3-ethylenedioxy-17,20:20,21-bismethylenedioxypregn-5-en-11-one.

To 125 g. of the 3-ethylenedioxy-17,20:20,21-bismethylenedioxypregn-5-en-11-one in 2500 ml. of benzene at 10° C. was added with stirring over 15 min. a freshly prepared solution of 125 ml. of 40% peracetic acid and 12.5 g. of anhydrous sodium acetate. The mixture was stirred at 10° C. for about 1 hour, allowed to come to room temperature and stirred for an additional period of about 3.5 hours. A solution of 100 g. of sodium hydroxide in 1 l. of water was added slowly. The organic layer was washed with water and the α-epoxide which had precipitated was separated by filtration. The filtrate was dried, concentrated in vacuo, and the residue was crystallized from methylene chloride giving, when combined with the precipitate above, 41.6 g. of 5α,6α-epoxy-3-ethylenedioxy-17,20:20,21 - bismethylenedioxypregnan - 11-one, M.P. 295–298° C. and a second crop of 15.1 g. with M.P. 293–296° C. Concentration of the filtrates gave 42.6 g. of 5β,6β-epoxy-3-ethylenedioxy-17,20:20,21-bismethylenedioxypregnan-11-one, M.P. 210–216° C.

In the same manner following the procedure of Preparation 1, other starting materials of Formulae I–A and I–C are prepared by substituting in place of cortisone the selected compound of Formula 4, for example, from 2α-methyl-17α,21-dihydroxypregn-4-ene-3,11,20-trione,
9α-fluoro-17α,21-dihydroxypregn-4-ene-3,11,20-trione,
16α-fluoro-17α,21-dihydroxypregn-4-ene-3,11,20-trione,
16α-methyl-17α,21-dihydroxypregn-4-ene-3,11,20-trione,
16β-methyl-17α,21-dihydroxypregn-4-ene-3,11,20-trione,
2α,16α-dimethyl-17α,21-dihydroxypregn-4-ene-3,11,20-trione,
2α,16β-dimethyl-17α,21-dihydroxypregn-4-ene-3,11,20-trione,
2α-methyl-9α-fluoro-17α,21-dihydroxypregn-4-ene-3,11,20-trione,
16α-methyl-9α-fluoro-17α,21-dihydroxypregn-4-ene-3,11,20-trione, 16β-methyl-9α-fluoro-17α,21-dihydroxypregn-4-ene-3,11,20-trione,
2α,16β-dimethyl-9α-fluoro-17α,21-dihydroxypregn-4-ene-3,11,20-trione,
17α,11β,21-trihydroxypregn-4-ene-3,20-dione,
2α-methyl-17α,11β,21-trihydroxypregn-4-ene-3,20-dione,
9α-fluoro-17α,11β,21-trihydroxypregn-4-ene-3,20-dione,
9α-fluoro-16α-chloro-17α,11β,21-trihydroxypregn-4-ene-3,20-dione,
16α-chloro-17α,11β,21-trihydroxypregn-4-ene-3,20-dione,
16β-chloro-17α,11β,21-trihydroxypregn-4-ene-3,20-dione,
16α-methoxy-17α,11β,21-trihydroxypregn-4-ene-3,20-dione,
16α-methyl-17α,11β,21-trihydroxypregn-4-ene-3,20-dione,
16β-methyl-17α,11β,21-trihydroxypregn-4-ene-3,20-dione,
2α,16α-dimethyl-17α,11β,21-trihydroxypregn-4-ene-3,20-dione,
2α,16β-dimethyl-17α,11β,21-trihydroxypregn-4-ene-3,20-dione,
2α-methyl-9α-fluoro-17α,11β,21-trihydroxypregn-4-ene-3,20-dione,
2α-methyl-16α-fluoro-17α,11β,21-trihydroxypregn-4-ene-3,20-dione,
2α-methyl-9α,16α-difluoro-17α,11β,21-trihydroxypregn-4-ene-3,20-dione,
16α-methyl-9α-fluoro-17α,11β,21-trihydroxypregn-4-ene-3,20-dione,
16β-methyl-9α-fluoro-17α,11β,21-trihydroxypregn-4-ene-3,20-dione,
2α,16α-dimethyl-9α-fluoro-17α,11β,21-trihydroxypregn-4-ene-3,20-dione,
2α,16β-dimethyl-9α-fluoro-17α,11β,21-trihydroxypregn-4-ene-3,20-dione,
17α,21-dihydroxypregn-4-ene-3,20-dione,
2α-methyl-17α,21-dihydroxypregn-4-ene-3,20-dione,
16α-methyl-17α,21-dihydroxypregn-4-ene-3,20-dione,
16β-methyl-17α,21-dihydroxypregn-4-ene-3,20-dione,
16α-fluoro-17α,21-dihydroxypregn-4-ene-3,20-dione,
16β-chloro-17α,21-dihydroxypregn-4-ene-3,20-dione,
16α-methoxy-17α,21-dihydroxypregn-4-ene-3,20-dione,
2α,16α-dimethyl-17α,21-dihydroxypregn-4-ene-3,20-dione,
2α,16β-dimethyl-17α,21-dihydroxypregn-4-ene-3,20-dione,
2α-methyl-16α-fluoro-17α,21-dihydroxypregn-4-ene-3,20-dione, and the like, there are obtained
2α-methyl-5α,6α-epoxy- and 5β,6β-epoxy-3-ethylenedioxy-17,20:20,21-bismethylenedioxypregnan-11-one,
9α-fluoro-5α,6α-epoxy- and 5β,6β-epoxy-3-ethylenedioxy-17,20:20,21-bismethylenedioxpregnan-11-one,
16α-fluoro-5α,6α-epoxy- and 5β,6β-epoxy-3-ethylenedioxy17,20:20,21-bismethylenedioxypregnan-11-one,
16α-methyl-5α,6α-epoxy- and 5β,6β-epoxy-3-ethylenedioxy-17,20:20,21-bismethylenedioxypregnan-11-one,
16β-methyl-5α,6α-epoxy- and 5β,6β-epoxy-3-ethylenedioxy-17,20:20,21-bismethylenedioxypregnan-11-one,
2α,16α-dimethyl-5α,6α-epoxy- and 5β,6β-epoxy-3-ethylenedioxy-17,20:20,21-bismethylenedioxypregnan-11-one,
2α,16β-dimethyl-5α,6α-epoxy- and 5β,6β-epoxy-3-ethylenedioxy-17,20:20,211bismethylenedioxypregnan-11-one,
2α-methyl-9α-fluoro-5α,6α-epoxy- and 5β,6β-epoxy-3-ethylenedioxy-17,20:20,21-bismethylenedioxypregnan-11-one,
16α-methyl-9α-fluoro-5α,6α-epoxy- and 5β,6β-epoxy-3-ethylenedioxy-17,20:20,21-bismethylenedioxypregnan-11-one,
16β-methyl-9α-fluoro-5α,6α-epoxy- and 5β,6β-epoxy-3-ethylenedioxy-17,20:20,21-bismethylenedioxypregnan-11-one,
2α,16α-dimethyl-9α-fluoro-5α,6α-epoxy- and 5β,6β-epoxy-3-ethylenedioxy-17,20:20,21-bismethylenedioxypregnan-11-one,
2α,16β-dimethyl-9α-fluoro-5α,6α-epoxy- and 5β,6β-epoxy-3-ethylenedioxy-17,20:20,21-bismethylenedioxypregnan-11-one,
5α,6α-epoxy- and 5β,6β-epoxy-3-ethylenedioxy-17,20:20,21-bismethylenedioxypregnan-11β-ol,
2α-methyl-5α,6α-epoxy- and 5β,6β-epoxy-3-ethylenedioxy-17,20:20,21-bismethylenedioxypregnan-11β-ol,
9α-fluoro-5α,6α-epoxy- and 5β,6β-epoxy-3-ethylenedioxy-17,20:20,21-bismethylenedioxypregnan-11β-ol,
9α-fluoro-16α-chloro-5α,6α-epoxy- and 5β,6β-epoxy-3-ethylenedioxy-17,20:20,21-bismethylenedioxypregnan-11β-ol,
16α-chloro-5α,6α-epoxy- and 5β,6β-epoxy-3-ethylenedioxy-17,20:20,21-bismethylenedioxypregnan-11β-ol,
16β-chloro-5α,6α-epoxy- and 5β,6β-epoxy-3-ethylenedioxy-17,20:20,21-bismethylenedioxypregnan-11β-ol,
16α-methoxy-5α,6α-epoxy- and 5β,6β-epoxy-3-ethylenedioxy-17,20:20,21-bismethylenedioxypregnan-11β-ol,
16α-methyl-5α,6α-epoxy- and 5β,6β-epoxy-3-ethylenedioxy-17,20:20,21-bismethylenedioxypregnan-11β-ol,
16β-methyl-5α,6α-epoxy- and 5β,6β-epoxy-3-ethylenedioxy-17,20:20,21-bismethylenedioxypregnan-11β-ol,
2α,16α-dimethyl-5α,6α-epoxy- and 5β,6β-epoxy-3-ethylenedioxy-17,20:20,21-bismethylenedioxypregnan-11β-ol,
2α,16β-dimethyl-5α,6α-epoxy- and 5β,6β-epoxy-3-ethylenedioxy-17,20:20,21-bismethylenedioxypregnan-11β-ol,
2α-methyl-9α-fluoro-5α,6α-epoxy- and 5β,6β-epoxy-3-ethylenedioxy-17,20:20,21-bismethylenedioxypregnan-11β-ol,
2α-methyl-16α-fluoro-5α,6α-epoxy- and 5β,6β-epoxy-3-ethylenedioxy-17,20:20,21-bismethylenedioxypregnan-11β-ol,
2α-methyl-9α,16α-difluoro-5α,6α-epoxy- and 5β,6β-epoxy-3-ethylenedioxy-17,20:20,21-bismethylenedioxypregnan-11β-ol,
16α-methyl-9α-fluoro-5α,6α-epoxy- and 5β,6β-epoxy-3-ethylenedioxy17,20:20,21-bismethylenedioxypregnan-11β-ol,
16β-methyl-9α-fluoro-5α,6α-epoxy- and 5β,6β-epoxy-3-ethylenedioxy17,20:20,21-bismethylenedioxypregnan-11β-ol,
2α,16α-dimethyl-9α-fluoro-5α,6α-epoxy- and 5β,6β-epoxy-3-ethylenedioxy-17,20:20,21-bismethylenedioxypregnan-11β-ol,
2α,16β-dimethyl-9α-fluoro-5α,6α-epoxy- and 5β,6β-epoxy-3-ethylenedioxy-17,20:20,21-bismethylenedioxypregnan-11β-ol,
5α,6α-epoxy- and 5β,6β-epoxy-3-ethylenedioxy-17,20:20,21-bismethylenedioxypregnane,
2α-methyl- 5α,6α-epoxy- and 5β,6β-epoxy-3-ethylenedioxy-17,20:20,21-bismethylenedioxypregnane,
16α-methyl-5α,6α-epoxy- and 5β,6β-epoxy-3-ethylenedioxy-17,20:20,21-bismethylenedioxypregnane,
16β-methyl-5α,6α-epoxy- and 5β,6β-epoxy-3-ethylenedioxy-17,20:20,21-bismethylenedioxypregnane,
16α-fluoro-5α,6α-epoxy- and 5β,6β-epoxy-3-ethylenedioxy-17,20:20,21-bismethylenedioxypregnane,
16β-chloro-5α,6α-epoxy- and 5β,6β-epoxy-3-ethylenedioxy-17,20:20,21-bismethylenedioxypregnane,
16α-methoxy-5α,6α-epoxy- and 5β,6β-epoxy-3-ethylenedioxy-17,20:20,21-bismethylenedioxypregnane,
2α,16α-dimethyl-5α,6α-epoxy- and 5β,6β-epoxy-3-ethylenedioxy-17,20:20,21-bismethylenedioxypregnane,
2α,16β-dimethyl-5α,6α-epoxy- and 5β,6β-epoxy-3-ethylenedioxy-17,20:20,21-bismethylenedioxypregnane, and
2α-methyl-16α-fluoro-5α,6α-epoxy- and 5β,6β-epoxy-3-ethylenedioxy17,20:20,21-bismethylenedioxypregnane,
respectively.

Similarly, other alkanediols can be substituted in place of ethylene glycol and other aldehydes can be used in place of formaldehyde to produce the other 3-alkylenedioxy and 17,20:20,21-bisalkylidenedioxy starting materials of Formulae I–A and I–C.

PREPARATION 2

*5α,6α-epoxy-3-ethylenedioxy-17,20:20,21-bismethylenedioxypregnan-11β-ol (I–A)*

To a solution of 10 g. of 5α,6α-epoxy-3-ethylenedioxy-17,20:20,21-bismethylenedioxypregnan-11-one in methylene chloride was added in one portion with stirring a solution of 7.0 g. of sodium borohydride in 15 ml. of water and 100 ml. of 95% ethanol. The mixture was stirred at room temperature for about 15 hours, diluted with water and the product extracted with methylene chloride. The organic extract was washed with water, dried, concentrated to about 200 ml., and 400 ml. of warm isopropyl alcohol was added. Further concentration and cooling gave 8.2 g. of 5α,6α-epoxy-2-ethylenedioxy-17,20:20,21-bismethylenedioxypregnan-11β-ol, M.P. 296° C. dec. (inserted in preheated bath); an analytical sample recrystallized from methylene chloride-methanol melted at 240–242° C. dec. or 296° C. dec. (preheated bath).

*Analysis.*—Calcd. for $C_{25}H_{36}O_8$: C, 64.63; H, 7.81. Found: C, 64.73; H, 7.88.

In the same manner the other 5α,6α-epoxy- and 5β,6β-epoxy-11-oxo compounds of Formula I–A and I–C, for example those listed in Preparation 1, above, can likewise be reduced to the corresponding 11β-hydroxy compounds.

EXAMPLE 1

*11β-hydroxy-6α-(2'-hydroxyethyl)-17,20:20,21-bismethylenedioxypregna-4-en-3-one*

To a mixture of 24.5 g. of freshly distilled ethoxyacetylene in 500 ml. of tetrahydrofuran (distilled from lithium aluminum hydride) under a nitrogen atmosphere was added with stirring 100 ml. of 3 M methyl magnesium bromide. The mixture was stirred for 1 hour when 20 g. of 5α,6α-epoxy-3-ethylenedioxy-17,20:20,21-bismethylenedioxypregnan-11β-ol in 500 ml. of methylene chloride was added. The mixture was refluxed gently for about 20 hours. A solution of 20 g. of ammonium chloride in 150 ml. of water was then added followed by 500 ml. of methylene chloride. The mixture was filtered and the solids were washed with methylene chloride. The filtrate was diluted with 2.1 of water containing 75 g. of ammonium chloride. The aqueous layer was extracted with methylene chloride and the combined organic layers were washed with aqueous ammonium chloride solution, water, dried and concentrated in vacuo. Removal of the solvent and crystallization of the product from acetone (using Darco to remove dark colored impurities) gave 12.6 g. of 6β-ethoxyethynyl - 3 - ethylenedioxy-17,20:20,21-bismethylenedioxypregnane-5α,11β-diol, M.P. 234–236° C. (dec.) (preheated bath); an analytical sample recrystallized from acetone melted at 238° C. (dec.).

*Analysis.*—Calcd. for $C_{29}H_{42}O_9$: C, 65.15; H, 7.92. Found: C, 65.33; H, 7.98.

To a mixture of 12.3 g. of the 6β-ethoxyethynyl-3-ethylenedioxy-17,20:20,21 - bismethylenedioxypregnane-5α,11β-diol in 200 ml. of redistilled tetrahydrofuran was added 20 ml. of 10% sulfuric acid. The mixture was stirred at room temperature for about 6 hours and then it was diluted with water and extracted with methylene chloride. The extract was washed with dilute sodium bicarbonate solution, water, dried, concentrated and the residue was crystallized from ethyl acetate giving 9.85 g. of 5α,11β - dihydroxy - 17,20:20,21-bismethylenedioxy-3-oxopregnane-6β-acetic acid ethyl ester, M.P. 231–232° C. dec.; an analytical sample recrystallized from ethyl acetate melted at 244.5–246° C.

*Analysis.*—Calcd. for $C_{27}H_{40}O_9$: C, 63.76; H, 7.93. Found: C, 63.13; H, 7.62.

To a mixture of 2.0 g. of 5α,11β-dihydroxy-17,20:20,21 -bismethylenedioxy - 3 - oxopregnane - 6β- acetic acid ethyl ester in 10 ml. of methanol at 55° C. was added with stirring under a nitrogen atmosphere 1.0 ml. of pyrrolidine. The mixture was cooled, 25 ml. of dry toluene was added and the mixture was concentrated to a syrup at about 25° C. Another 25 ml. of toluene was added and the mixture was again concentrated in vacuo giving a residue comprising 11β-hydroxy-3-(N-pyrrolidyl)-17,20:20,21 - bismethylenedioxypregna - 3,5-diene-6β-acetic acid ethyl ester (3-pyrrolidyl enamine of 11β - hydroxy - 17,20:20,21 - bismethylenedioxy - 3-oxopregn-4-ene-6β-acetic acid ethyl ester).

The residue of enamine thus obtained was dissolved in dry tetrahydrofuran-benzene (2:1) and added dropwise to a stirred mixture of 1 g. of lithium aluminum hydride in 100 ml. of ether. The mixture was stirred under a nitrogen atmosphere for about 2 hours, cooled and a solution of 8 ml. of water and 15 ml. of tetrahydrofuran was added cautiously. The resulting mixture was concentrated to a paste in vacuo and 60 ml. of methanol and 12 ml. of glacial acetic acid were added. The mixture was stirred at 50° C. for about 15 mintues, cooled in a nitrogen atmosphere and a solution of 15 g. of sodium hydroxide in 75 ml. of water was added. This mixture was stirred at 35–40° C. for about 15 minutes, neutralized with acetic acid and concentrated in vacuo to remove most of the methanol. The mixture was cooled, made distinctly acetic with hydrochloric acid and the product was extracted with chloroform. The chloroform extract was washed with dilute acid, dilute base, water, dried and concentrated. The residue was chromatographed on Florisil (synthetic magnesium silicate hereinafter referred to as Florisil). The column was eluted with Skellysolve B isomeric hexanes (hereinafter referred to as Skellysolve B) methylene chloride (3:1) containing increasing portions of acetone and those fractions of eluate which, on the basis of infrared absorption analysis, were found to contain the desired material were combined and evaporated to dryness. There was thus obtained 1.27 g. of 11β-hydroxy-6α - (2' - hydroxyethyl) - 17,20:20,21 - bismethylenedioxypregn-4-en-3-one, crystallized as an ethyl acetate solvate, M.P. 120° C. In another run, this product had M.P. 124–125° C. dec.

EXAMPLE 2

*11β-hydroxy-6α-(2'-hydroxyethyl)-17,20:20,21-bismethylenedioxypregn-4-en-3-one*

A mixture of 50 ml. of glacial acetic acid, 25 ml. of methylene chloride and 5 g. of 6β - ethoxyethynyl - 3-ethylenedioxy - 17,20:20,21 - bismethylenedioxypregnane-5α,11β-diol, prepared from 5α-6α-epoxy-3-ethylenedioxy-17,20:20,21 - bismethylenedioxypregnan - 11β-ol in the same manner as disclosed in Example 1, is allowed to stand for about 18 hours at room temperature. The mixture is then poured into 500 ml. of ice and water containing 25 g. of sodium hydroxide and extracted with warm ethyl acetate. The extract is washed with dilute sodium bicarbonate, water, dried and concentrated in vacuo. The residue thus obtained is dissolved in 125 ml. of tetrahydrofuran and added cautiously to 4 g. of lithium aluminum hydride in 400 ml. of ether. The mixture is refluxed until the reaction is complete (about 2 hours is usually sufficient) and then 80 ml. of 2 N sodium hydroxide is added cautiously. The reaction mixture is then filtered and the solids are washed with warm ethyl acetate. The organic layer of the combined filtrate and wash is then separated, dried over anhydrous sodium sulfate, filtered and concentrated in vacuo to give a residue comprising 3-ethylenedioxy - 5,11β - dihydroxy - 6β - (2'-hydroxyethyl)-17,20:20,21-bismethylenedioxy-5α-pregnane.

The residue thus obtained is dissolved in tetrahydrofuran and 6 ml. of 10% sulfuric acid is added with stirring. The mixture is stirred for about 6 hours and then 75 ml. of 0.5 N sodium bicarbonate solution is added.

Most of the tetrahydrofuran is removed in vacuo and the product is extracted with ethyl acetate. The extract is washed with water, dried and concentrated in vacuo to give a residue comprising 5,11β-dihydroxy-6β-(2'-hydroxyethyl) - 17,20:20,21 - bismethylenedioxy - 5α -pregnan-3-one.

The residue thus obtained is dissolved in 150 ml. of methanol containing 1 g. of sodium hydroxide and the mixture is refluxed for 2 to 5 minutes, then concentrated in vacuo. The residue is diluted with water and extracted with warm ethyl acetate. The extract is washed with water, dried and concentrated in vacuo. The residue thus obtained is crystallized from a suitable solvent or combination of solvents, e.g. aqueous acetone giving 11β-hydroxy - 6α - (2' - hydroxyethyl) - 17,20:20,21 - bismethylenedioxypregn-4-ene-3-one.

In the same manner substituting as starting material in Example 1 or Example 2, other 5α,6α-epoxides of Formula I-A in place of 5α,6α - epoxy - 3 - ethylenedioxy - 17,20:20,21-bismethylenedioxypregnan-11β-ol, for example:

2α-methyl-5α,6α-epoxy-3-ethylenedioxy-17,20:20,21-bismethylenedioxypregnan-11β-ol,
9α-fluoro-5α,6α-epoxy-3-ethylenedioxy-17,20:20,21-bismethylenedioxypregnan-11β-ol,
9α-fluoro-16α-chloro-5α,6α-epoxy-3-ethylenedioxy-17,20:20,21-bismethylenedioxypregnan-11β-ol,
16α-chloro-5α,6α-epoxy-3-ethylenedioxy-17,20:20,21-bismethylenedioxypregnan-11β-ol,
16β-chloro-5α,6α-epoxy-3-ethylenedioxy-17,20:20,21-bismethylenedioxypregnan-11β-ol,
16α-methoxy-5α,6α-epoxy-3-ethylenedioxy-17,20:20,21-bismethylenedioxypregnan-11β-ol,
16α-methyl-5α,6α-epoxy-3-ethylenedioxy-17,20:20,21-bismethylenedioxypregnan-11β-ol,
16β-methyl-5α,6α-epoxy-3-ethylenedioxy-17,20:20,21-bismethylenedioxypregnan-11β-ol,
2α,16α-dimethyl-5α,6α-epoxy-3-ethylenedioxy-17,20:20,21-bismethylenedioxypregnan-11β-ol,
2α,16β-dimethyl-5α,6α-epoxy-3-ethylenedioxy-17,20:20,21-bismethylenedioxypregnan-11β-ol,
2α-methyl-9α-fluoro-5α,6α-epoxy-3-ethylenedioxy-17,20:20,21-bismethylenedioxypregnan-11β-ol,
2α-methyl-16α-fluoro-5α,6α-epoxy-3-ethylenedioxy-17,20:20,21-bismethylenedioxypregnan-11β-ol,
2α-methyl-9α,16α-difluoro-5α,6α-epoxy-3-ethylenedioxy-17,20:20,21-bismethylenedioxypregnan-11β-ol,
16α-methyl-9α-fluoro-5α,6α-epoxy-3-ethylenedioxy-17,20:20,21-bismethylenedioxypregnan-11β-ol,
16β-methyl-9α-fluoro-5α,6α-epoxy-3-ethylenedioxy-17,20:20,21-bismethylenedioxypregnan-11β-ol,
2α,16α-dimethyl-9α-fluoro-5α,6α-epoxy-3-ethylenedioxy-17,20:20,21-bismethylenedioxypregnan-11β-ol,
2α,16β-dimethyl-9α-fluoro-5α,6α-epoxy-3-ethylenedioxy-17,20:20,21-bismethylenedioxypregnan-11β-ol,
2α-methyl-5α,6α-epoxy-3-ethylenedioxy-17,20:20,21-bismethylenedioxypregnane,
16α-methyl-5α,6α-epoxy-3-ethylenedioxy-17,20:20,21-bismethylenedioxypregnane,
16β-methyl-5α,6α-epoxy-3-ethylenedioxy-17,20:20,21-bismethylenedioxypregnane,
16α-fluoro-5α,6α-epoxy-3-ethylenedioxy-17,20:20,21-bismethylenedioxypregnane,
16β-chloro-5α,6α-epoxy-3-ethylenedioxy-17,20:20,21-bismethylenedioxypregnane,
16α-methoxy-5α,6α-epoxy-3-ethylenedioxy-17,20:20,21-bismethylenedioxypregnane,
2α,16α-dimethyl-5α,6α-epoxy-3-ethylenedioxy-17,20:20,21-bismethylenedioxypregnane,
2α,16β-dimethyl-5α,6α-epoxy-3-ethylenedioxy-17,20:20,21-bismethylenedioxypregnane,
2α-methyl-16α-fluoro-5α,6α-epoxy-3-ethylenedioxy-17,20:20,21-bismethylenedioxypregnane, and the like, there are ultimately obtained the corresponding 2'-hydroxyethyl compounds of Formula V, such as 2α-methyl-11β-hydroxy-6α-(2'hydroxyethyl)-17,20:20,21-bismethylenedioxypregn-4-en-3-one,
9α-fluoro-11β-hydroxy-6α-(2'-hydroxyethyl)-17,20:20,21-bismethylenedioxypregn-4-en-3-one,
9α-fluoro-16α-chloro-11β-hydroxy-6α-(2'-hydroxyethyl)-17,20:20,21-bismethylenedioxypregn-4-en-3-one,
16α-chloro-11β-hydroxy-6α-(2'-hydroxyethyl)-17,20:20,21-bismethylenedioxypregn-4-en-3-one,
16β-chloro-11β-hydroxy-6α-(2'-hydroxyethyl)-17,20:20,21-bismethylenedioxypregn-4-en-3-one,
16α-methoxy-11β-hydroxy-6α-(2'-hydroxyethyl)-17,20:20,21-bismethylenedioxypregn-4-en-3-one,
16α-methyl-11β-hydroxy-6α-(2'-hydroxyethyl)-17,20:20,21-bismethylenedioxypregn-4-en-3-one,
16β-methyl-11β-hydroxy-6α-(2'-hydroxyethyl)-17,20:20,21-bismethylenedioxypregn-4-en-3-one,
2α,16α-dimethyl-11β-hydroxy-6α-(2'-hydroxyethyl)-17,20:20,21-bismethylenedioxypregn-4-en-3-one,
2α,16β-dimethyl-11β-hydroxy-6α-(2'-hydroxyethyl)-17,20:20,21-bismethylenedioxypregn-4-en-3-one,
2α-methyl-9α-fluoro-11β-hydroxy-6α-(2'-hydroxyethyl)-17,20:20,21-bismethylenedioxypregn-4-en-3-one,
2α-methyl-16α-fluoro-11β-hydroxy-6α-(2'-hydroxyethyl)-17,20:20,21-bismethylenedioxypregn-4-en-3-one,
2α-methyl-9α,16α difluoro-11β-hydroxy-6α-(2'-hydroxyethyl)-17,20:20,21-bismethylenedioxypregn-4-en-3-one,
16α-methyl-9α-fluoro-11β-hydroxy-6α-(2'-hydroxyethyl)-17,20:20,21-bismethylenedioxypregn-4-en-3-one,
16β-methyl-9α-fluoro-11β-hydroxy-6α-(2'-hydroxyethyl)-17,20:20,21-bismethylenedioxypregn-4-en-3-one,
2α,16α-dimethyl-9α-fluoro-11β-hydroxy-6α-(2'-hydroxyethyl)-17,20:20,21-bismethylenedioxypregn-4-en-3-one,
2α,16β-dimethyl-9α-fluoro-11β-hydroxy-6α-(2'-hydroxyethyl)-17,20:20,21-bismethylenedioxypregn-4-en-3-one,
2α-methyl-6α-(2'-hydroxyethyl)-17,20:20,21-bismethylenedioxypregn-4-en-3-one,
16α-methyl-6α-(2'-hydroxyethyl)-17,20:20,21-bismethylenedioxypregn-4-en-3-one,
16β-methyl-6α-(2'-hydroxyethyl)-17,20:20,21-bismethylenedioxypregn-4-en-3-one,
16α-fluoro-6α-(2'-hydroxyethyl)-17,20:20,21-bismethylenedioxypregn-4-en-3-one,
16β-chloro-6α-(2'-hydroxyethyl)-17,20:20:21-bismethylenedioxypregn-4-en-3-one,
16α-methoxy-6α-(2'-hydroxyethyl)-17,20:20,21-bismethylenedioxypregn-4-en-3-one,
2α,16α-dimethyl-6α-(2'-hydroxyethyl)-17,20:20,21-bismethylenedioxypregn-4-en-3-one,
2α,16β-dimethyl-6α-(2'-hydroxyethyl)-17,20:20,21-bismethylenedioxypregn-4-en-3-one, and
2α-methyl-16α-fluoro-6α-(2'-hydroxyethyl)-17,20:20,21-bismethylenedioxypregn-4-en-3-one, respectively, and the like.

When the corresponding 11-oxo compounds of Formula I-A for example those corresponding otherwise to the 11β-hydroxy-5α,6α-epoxy compounds listed, above, are used as starting materials the 11-oxo group is concomitantly reduced to 11β-hydroxy giving the corresponding 11β-hydroxy-6α-(2'-hydroxyethyl) compounds of Formula V, for example the 11β-hydroxy compounds of Formula V which are listed in the preceding paragraph.

EXAMPLE 3

*11β-hydroxy-6α-(2'-hydroxyethyl)-17,20:20,21-bismethylenedioxypregn-4-en-3-one*

To 10 g. of 5β,6β-epoxy-3-ethylenedioxy-17,20:20,21-bismethylenedioxypregnan-11-one in about 200 ml. of dry benzene and about 200 ml. of anhydrous ether under a nitrogen atmosphere is added rapidly 38 ml. of boron trifluoride-ethyl ether. The mixture is stirred at room temperature until the reaction is complete (about 3 to 5 hours) and then poured into about 1.5 l. of ice and water. The mixture is shaken and the organic layer separated quickly and washed immediately with sodium bicarbonate solution, water, dried and concentrated in vacuo. The residue is dissolved in boiling methanol (nitrogen atmosphere) and a solution of 0.5 g. of potassium hydroxide in 1 ml. of water is added. The mixture is then refluxed for a few minutes, cooled slowly over a period of about 45 minutes and concentrated in vacuo. The residue thus obtained is diluted with water, extracted with methylene chloride and the methylene chloride extract is washed with water, dried and concentrated in vacuo. The residue thus obtained is crystallized from acetone to give 3-ethylenedioxy-17,20:20,21-bismethylenedioxypregnane-6,11-dione.

Zinc turnings are purified by dipping them briefly in dilute hydrochloric acid, water, acetone and then drying them in a vacuum oven. A mixture is then prepared consisting of 5 g. of these purified zinc turnings, a trace of iodine, 100 ml. of dry benzene and 100 ml. of anhydrous ether under an atmosphere of nitrogen. To this stirred mixture is added 5 g. of 3-ethylenedioxy-17,20:20,21-bismethylenedioxypregnane-6,11-dione and 2 ml. of methyl bromoacetate. For the next three 45-minute intervals, 2.5 g. of zinc is added and at the 90-minute interval an additional 2 ml. of methyl bromoacetate is added. The mixture is stirred and refluxed until the reaction is complete (a total of about 4 hours is usually sufficient). This mixture is then cooled and a small amount of acetic acid is added. The solution is decanted from the excess zinc turnings and the zinc is rinsed with ether and benzene. The combined organic solution is washed with dilute acetic acid, water, dilute ammonium hydroxide, water, dried and concentrated in vacuo. The residue thus obtained is chromatographed on Florisil using methylene chloride-Skellysolve B (1:1) containing increasing amounts of acetone as the eluent. Those fractions of eluate which, on the basis of infrared absorption analysis, are found to contain the desired product are combined and evaporated to dryness in vacuo to give 6-carbomethoxymethyl-3-ethylenedioxy - 6 - hydroxy-17,20:20,21-bismethylenedioxypregnan-11-one, which can be further purified by recrystallization from a suitable organic solvent or combination of organic solvents, e.g., acetone or acetone-Skellysolve B.

To a solution of 12.0 g. of 6-carbomethoxymethyl-3-ethylenedioxy - 6 - hydroxy-17,20:20,21-bismethylenedioxypregnan-11-one in pyridine at about 0° C., 8.0 ml. of thionyl chloride is added dropwise with stirring over a 5-minute period. The resulting mixture is stirred at about 0° C. until the reaction is complete and then poured into about 3 l. of ice and water. The precipitate thus obtained is collected on a filter, washed with water, and dried to give a mixture comprising 3-ethylenedioxy-11-oxo-17,20:20,21-bismethylenedioxypregn-5-en-6-acetic acid methyl ester, 3-ethylenedioxy-11-oxo-17,20:20,21-bismethylenedioxy-5α-pregn-6-ene-6-acetic acid methyl ester and 3-ethylenedioxy - 11 - oxo-17,20:20,21-bismethylenedioxy-5α-pregnane-Δ$^{6a}$-acetic acid methyl ester.

Purification of the product is effected by chromatography on Florisil using methylene chloride-Skellysolve B containing increasing amounts of acetone as the eluent. Those fractions which on the basis of thin-layer chromatography or infrared absorption analysis show essentially a single product are combined and crystallized from a suitable organic solvent or combination of solvents, e.g., aqueous acetone, Skellysolve B-methylene chloride, Skellysolve B-acetone and the like to give 3-ethylenedioxy-11-oxo-17,20:20,21-bismethylenedioxy - 5α - pregnane-Δ$^{6a}$-acetic acid methyl ester and a mixture of the other two isomers (see above).

A solution of 5. g. of a mixture of 3-ethylenedioxy-11-oxo-17,20:20,21 - bismethylenedioxypregn - 5 - en-6-acetic acid methyl ester and 3-ethylenedioxy-11-oxo-17,20:20,21 - bismethylenedioxy-5α-pregn-6-en-6-acetic acid methyl ester in dry tetrahydrofuran is added dropwise with stirring to a mixture of 1.94 g. of lithium aluminum hydride in 380 ml. of anhydrous ether over a period of about 30 minutes. The mixture is refluxed until the reaction is complete (about 2 hours is usually sufficient), cooled and about 12 ml. of ethyl acetate is added cautiously followed by 22 ml. of 40% sodium hydroxide solution. The mixture is filtered and the filtrate concentrated in vacuo. The residue thus obtained is crystallized from a suitable organic solvent, e.g., acetone to give 3-ethylenedioxy-11β-hydroxy - 6 - (2'-hydroxyethyl)-17,20: 20,21-bismethylenedioxypregn-5-ene and 3-ethylenedioxy-11β-hydroxy-6-(2'-hydroxyethyl)-17,20:20,21 - bismethylenedioxy-5α-pregn-6-ene.

A mixture of 7.0 g. of 3-ethylenedioxy-11β-hydroxy-6-(2'-hydroxyethyl) - 17,20:20,21-bismethylenedioxypregn-5 - ene and 3-ethylenedioxy-11β-hydroxy-6-(2'-hydroxyethyl)-17,20:20,21-bismethylenedioxy-5α-pregn - 6 - ene, 200 ml. of methanol, 20 ml. of water, and 12 ml. of concentrated hydrochloric acid is stirred at room temperature for about 2 hours, then diluted with 400 ml. of water, cooled and filtered to give 11β-hydroxy-6-(2'-hydroxyethyl)-17,20:20,21-bismethylenedioxy - 5α - pregn-6-en-3-one and 11β-hydroxy-6α-(2'-hydroxyethyl-17,20: 20,21-bismethylenedioxypregn-4-en-3-one. The latter compound is recovered from the reaction mixture by chromatography on Florisil using methylene chloride containing increasing amounts of acetone as eluent.

In the same manner substituting as starting material in Example 3, other 5β,6β-epoxides of Formula I–C in place of 5β,6β-epoxides of Formula I–C in place of 5β,6β-epoxy - 3 - ethylenedioxy-17,20:20,21-bismethylenedioxypregnan-11-one, for example, 2α-methyl-5β,6β-epoxy-3-ethylenedioxy-17,20:20,21-bismethylenedioxypregnan-11-one, 9α-fluoro-5β,6β-epoxy-3-ethylenedioxy-17,20:20,21-bismethylenedioxypregnan-11-one, 16α-fluoro-5β,6β-epoxy-3-ethylenedioxy-17,20:20,21-bismethylenedioxypregnan-11-one, 16α-methyl-5β,6β-epoxy-3-ethylenedioxy-17,20:20,21-bismethylenedioxypregnan-11-one, 16β-methyl-5β,6β-epoxy-3-ethylenedioxy-17,20:20,21-bismethylenedioxypregnan-11-one, 2α,16α-dimethyl-5β,6β-epoxy-3-ethylenedioxy-17,20:20,21-bismethylenedioxypregnan-11-one, 2α,16β-dimethyl-5β,6β-epoxy-3-ethylenedioxy-17,20:20,21-bismethylenedioxypregnan-11-one, 2α-methyl-9α-fluoro-5β,6β-epoxy-3-ethylenedioxy-17,20:20,21-bismethylenedioxypregnan-11-one, 16α-methyl-9α-fluoro-5β,6β-epoxy-3-ethylenedioxy-17,20:20,21-bismethylenedioxypregnan-11-one, 16β-methyl-9α-fluoro-5β,6β-epoxy-3-ethylenedioxy-17,20:20,21-bimethylenedioxypregnan-11-one, 2α,16α-dimethyl-9α-fluoro-5β,6β-epoxy-3-ethylenedioxy-17,20:20,21-bismethylenedioxypregnan-11-one, 2α,16β-dimethyl-9α-fluoro-5β,6β-epoxy-3-ethylenedioxy-17,20:20,21-bismethylenedioxypregnan-11-one, 5β,6β-epoxy-3-ethylenedioxy-17,20:20,21-bismethylenedioxypregnane, 2α-methyl-5β,6β-epoxy-3-ethylenedioxy-17,20:20,21-bismethylenedioxypregnane, 16α-methyl-5β,6β-epoxy-3-ethylenedioxy-17,20:20,21-bismethylenedioxypregnane, 16β-methyl-5β,6β-epoxy-3-ethylenedioxy-17,20:20,21-bismethylenedioxypregnane, 16α-fluoro-5β,6β-epoxy-3-ethylenedioxy-17,20:20,21-bismethylenedioxypregnane, 16β-chloro-5β,6β-epoxy-3-ethylenedioxy-17,20:20,21-bismethylenedioxypregnane, 16α-methoxy-5β,6β-epoxy-3-ethylenedioxy-17,20:20:21-bismethylenedioxypregnane, 2α,16α-dimethyl-5β,6β-epoxy-3-ethylenedioxy-17,20:20,21-bismethylenedioxypregnane, 2α,16β-dimethyl-5β,6β-epoxy-3-ethylenedioxy-17,20:20,21-bismethylenedioxypregnane, 2α-methyl-16α-fluoro-5β,6β-epoxy-3-ethylenedioxy-
17,20:20:21-bismethylenedioxypregnane, and the like, there are ultimately obtained the corresponding 6α-(2'-hydroxyethyl) compounds of Formula V, such as 2α-methyl-11β-hydroxy-6α-(2'-hydroxyethyl)-17,20:
20,21-bismethylenedioxypregn-4-en-3-one,
9α-fluoro-11β-hydroxy-6α-(2'-hydroxyethyl)-17,20:
20,21-bismethylenedioxypregn-4-en-3-one,
16α-fluoro-11β-hydroxy-6α-(2'-hydroxyethyl)-17,20:
20,21-bismethylenedioxypregn-4-en-3-one,
16α-methyl-11β-hydroxy-6α-(2'-hydroxyethyl)-17,20:
20,21-bismethylenedioxypregn-4-en-3-one,
16β-methyl-11β-hydroxy-6α-(2'-hydroxyethyl)-17,20:
20,21-bismethylenedioxypregn-4-en-3-one,
2α,16α-dimethyl-11β-hydroxy-6α-(2'-hydroxyethyl)-
17,20:20,21-bismethylenedioxypregn-4-en-3-one,
2α,16β-dimethyl-11β-hydroxy-6α-(2'-hydroxyethyl)-
17,20:20,21-bismethylenedioxypregn-4-en-3-one,
2α-methyl-9α-fluoro-11β-hydroxy-6α-(2'-hydroxyethyl)-
17,20:20,21-bismethylenedioxypregn-4-en-3-one,
16α-methyl-9α-fluoro-11β-hydroxy-6α-(2'-hydroxyethyl)-
17,20:20,21-bismethylenedioxypregn-4-en-3-one,
16β-methyl-9α-fluoro-11β-hydroxy-6α-(2'-hydroxyethyl)-
17,20:20,21-bismethylenedioxypregn-4-en-3-one,
2α,16α-dimethyl-9α-fluoro-11β-hydroxy-6α-(2'-hydroxyethyl)-17,20:20,21-bismethylenedioxypregn-4-en-3-one,
2α,16β-dimethyl - 9α-fluoro-11β-hydroxy-6α-(2'-hydroxyethyl)-17,20:20,21-bismethylenedioxypregn-4-en-3-one,
6α-(2'-hydroxyethyl)-17,20:20,21-bismethylenedioxypregn-4-en-3-one,
2α-methyl-6α-(2'-hydroxyethyl)-17,20:20,21-bismethylenedioxypregn-4-en-3-one,
16α-methyl-6α-(2'-hydroxyethyl)-17,20:20,21-bimethylenedioxypregn-4-en-3-one,
16β-methyl-6α-(2'-hydroxyethyl)-17,20:20,21-bismethylenedioxypregn-4-en-3-one,
16α-fluoro-6α-(2'-hydroxyethyl)-17,20:20,21-bismethylenedioxpregn-4-en-3-one,
16β-chloro-6α-(2'-hydroxyethyl)-17,20:20,21-bismethylenedioxypregn-4-en-3-one,
16α-methoxy-6α-(2'-hydroxyethyl)-17,20:20,21-bismethylenedioxypregn-4-en-3-one,
2α,16α-dimethyl-6α-(2'-hydroxyethyl)-17,20:20,21-bismethylenedioxypregn-4-en-3-one,
2α,16β-dimethyl-6α-(2'-hydroxyethyl)-17,20:20,21-bismethylenedioxypregn-4-en-3-one, and
2α-methyl-16α-fluoro-6α-(2'-hydroxyethyl)-17,20:20,21-bismethylenedioxypregn-4-en-3-one, respectively, and the like.

The 11β-hydroxy compounds of Formula I–C can likewise be used as starting materials in Example 3 to produce the corresponding 2'-hydroxyethyl compounds of Formula V. The additional step of oxidizing the 11β-hydroxy group, for example, using chromic acid, is necessary prior to treatment with thionyl chloride.

EXAMPLE 4

*11β-hydroxy-17,20:20,21-bismethylenedioxyspiro [pregn-4-ene-6,1'-cyclopropane]-3-one*

To 0.90 g. of 11β-hydroxy-6α-(2'-hydroxyethyl)-17,-20:20,21-bismethylenedioxypregn-4-ene-3-one in 5 ml. of dry pyridine and 5 ml. of methylene chloride was added with stirring 0.39 g. of p-toluenesulfonyl chloride. The mixture was stirred at room temperature for 5 hours, diluted with methylene chloride and washed with dilute acid, dilute base, water, dried and concentrated in vacuo to give a residue comprising 11β-hydroxy-6α-(2'-tosyloxyethyl)-17,20:20,21-bismethylenedioxypregn-4-en-3-one.

The crude tosylate thus obtained was dissolved in anhydrous t-butyl alcohol (nitrogen atmosphere) and 0.26 g. of potassium t-butoxide was added with stirring. The mixture was heated at 40° C. for about 1.5 hours, cooled, neutralized with acetic acid and concentrated in vacuo. The residue was dissolved in methylene chloride and the solution was washed with dilute acid, dilute base, water, dried and concentrated. The residue was crystallized from ether giving 0.45 g. of 11β-hydroxy-17,20:20,21-bismethylenedioxyspiro[pregn-4-ene - 6,1'-cyclopropane] - 3-one, M.P. 220–222° C. dec.; an analytical sample recrystallized from methylene chloride ether melted at 223–225° C., the infrared and NMR spectra confirmed the structure.

*Analysis.*—Calcd. for $C_{25}H_{34}O_6$: C, 69.74; H, 7.96. Found: C, 69.69; H, 7.85.

In the same manner substituting as starting material in Example 4, other 6α-(2'-hydroxyethyl) compounds of Formula V, for example those listed in Example 2, above, in place of 11β-hydroxy-6α-(2'-hydroxyethyl)-17,20,-21-bismethylenedioxypregn-4-en-3-one, is productive of the corresponding 6,1'-spirocyclopropanes of Formula VI, such as 2α-methyl-11β-hydroxy-17,20:20,21-bismethylenedioxyspiro[pregn-4-ene-6,1'-cyclopropane]-3-one,
9α-fluoro-11β-hydroxy-17,20:20,21-bismethylenedioxyspiro[pregn-4-ene-6,1'-cyclopropane]-3-one,
9α-fluoro-16α-chloro-11β-hydroxy-17,20:20,21-bismethylenedioxyspiro[pregn-4-ene-6,1'-cyclopropane]3-one,
16α-chloro-11β-hydroxy-17,20:20,21-bismethylenediyoxyspiro[pregn-4-ene-6,1'-cyclopropane]-3-one,
16β-chloro-11β-hydroxy-17,20:20,21-bismethylenedioxyspiro[pregn-4-ene-6,1'-cyclopropane]-3-one,
16α-methoxy-11β-hydroxy-17,20:20,21-bismethylenedioxyspiro[pregn-4-ene-6,1'-cyclopropane]-3-one,
16α-methyl-11β-hydroxy-17,20:20,21-bismethylenedioxyspiro[pregn-4-ene-6,1'-cyclopropane]-3-one,
16β-methyl-11β-hydroxy-17,20:20,21-bismethylenedioxyspiro[pregn-4-ene-6,1'-cyclopropane]-3-one,
2α,16α-dimethyl-11β-hydroxy-17,20:20,21-bismethylenedioxyspiro[pregn-4-ene-6,1'-cyclopropane]-3-one,
2α,16β-dimethyl-11β-hydroxy-17,20:20,21-bismethylenedioxyspiro[pregn-4-ene-6,1'-cyclopropane]-3-one,
2α-methyl-9α-fluoro-11β-hydroxy-17,20:20,21-bismethylenedioxyspiro[pregn-4-6,1'-cyclopropane]-3-one,
2α-methyl-16α-fluoro-11β-hydroxy-17,20:20,21-bismethylenedioxyspiro[pregn-4-ene-6,1'-cyclopropane]-3-one,
2α-methyl-9α,16α-difluoro-11β-hydroxy-17,20:20,21-bismethylenedioxyspiro[pregn-4-ene-6,1'-cyclopropane]-3-one,
16α-methyl-9α-fluoro-11β-hydroxy-17,20:20,21-bismethylenedioxyspiro[pregn-4-ene-6,1'-cyclopropane]-3-one,
16β-methyl-9α-fluoro-11β-hydroxy-17,20:20,21-bismethylenedioxyspiro[pregn-4-ene-6,1'-cyclopropane]-3-one,
2α,16α-dimethyl-9α-fluoro-11β-hydroxy-17,20:20,21-bismethylenedioxyspiro[pregn-4-ene-6,1'-cyclopropane]-3-one,
2α,16β-dimethyl-9α-fluoro-11β-hydroxy-17,20:20,21-bismethylenedioxyspiro[pregn-4-ene-6,1'-cyclopropane]-3-one,
17,20:20,21-bismethylenedioxspiro[pregn-4-en-6,1'-cyclopropane]-3-one,
2α-methyl-17,20:20,21-bismethylenedioxyspiro[pregn-4-en-6,1'-cyclopropane]-3-one,
16α-methyl-17,20:20,21-bismethylenedioxyspiro[pregn-4-en-6,1'-cyclopropane]-3-one,
16β-methyl-17,20:20,21-bismethylenedioxyspiro[pregn-4-en-6,1'-cyclopropane]-3-one,
16α-fluoro-17,20:20,21-bismethylenedioxyspiro[pregn-4-en-6,1'-cyclopropane]-3-one, 16β-chloro-17,20:20,21-bismethylenedioxyspiro
  [pregn-4-en-6,1′-cyclopropane]-3-one,
16α-methoxy-17,20:20,21-bismethylenedioxyspiro
  [pregn-4-en-6,1′-cyclopropane]-3-one,
2α,16α-dimethyl-17,20:20,21-bismethylenedioxyspiro
  [pregn-4-en-6,1′-cyclopropane]-3-one,
2α,16β-dimethyl-17,20:20,21-bismethylenedioxyspiro
  [pregn-4-en-6,1′-cyclopropane]-3-one,
2α-methyl-16α-fluoro-17,20:20,21-bismethylenedioxy-
  spiro[pregn-4-en-6,1′-cyclopropane]-3-one, respectively, and the like.

Example 5

*17,20:20,21-bismethylenedioxyspiro[pregn-4-
ene-6,1′-cyclopropane]-3,11-dione*

To 300 mg. of 11β-hydroxy-17,20:20,21-bismethylenedioxyspiro[pregn-4-ene-6,1′-cyclopropane] - 3 - one in about 5 ml. of pyridine is added a suspension of chrominum trioxide pyridine complex (prepared from 300 mg. of chromium trioxide and 5 ml. of pyridine). The reaction mixture is allowed to stand at room temperature until the reaction is complete, a period of about 18 to 24 hours is usually sufficient. Water and methylene chloride (1:1) is then added and the mixture is stirred thoroughly. The organic layer is separated, washed with dilute acid, water, dried over anhydrous sodium sulfate and evaporated in vacuo to remove the solvent, giving 17,20:20,21 - bismethylenedioxyspiro[pregn - 4 - ene-6,1-cyclopropane]-3,11-dione, which can be further purified by recrystallization from methylene chloride-Skellysolve B.

In the same manner substituting as starting material in Example 5, other 11β-hydroxy compounds of Formula VI, for example those listed in Example 4, above, in place of 11β-hydroxy - 17,20:20,21 - bismethylenedioxyspiro [pregn-4-ene-6,1′-cyclopropane]-3-one, is productive of the corresponding 11-oxo compounds of Formula VII, such as 2α-methyl-17,20:20,21-bismethylenedioxyspiro
  [pregn-4-ene-6,1′-cyclopropane]-3,11-dione,
9α-fluoro-17,20:20,21-bismethylenedioxyspiro
  [pregn-4-ene-6,1′-cyclopropane]-3,11-dione,
9α-fluoro-16α-chloro-17,20:20,21-bismethylenedioxy
  spiro[pregn-4-ene-6,1′-cyclopropane]-3,11-dione,
16α-chloro-17,20:20,21-bismethylenedioxyspiro
  [pregn-4-ene-6,1′-cyclopropane]-3,11-dione,
16β-chloro-17,20:20,21-bismethylenedioxyspiro
  [pregn-4-ene-6,1′-cyclopropane]-3,11-dione,
16α-methoxy-17,20:20,21-bismethylenedioxyspiro
  [pregn-4-ene-6,1′-cyclopropane]-3,11-dione,
16α-methyl-17,20:20,21-bismethylenedioxyspiro
  [pregn-4-ene-6,1′-cyclopropane]-3,11-dione,
16β-methyl-17,20:20,21-bismethylenedioxyspiro
  [pregn-4-ene-6,1′-cyclopropane]-3,11-dione,
2α,16α-dimethyl-17,20:20,21-bismethylenedioxyspiro
  [pregn-4-ene-6,1′-cyclopropane]-3,11-dione,
2α,16β-dimethyl-17,20:20,21-bismethylenedioxyspiro
  [pregn-4-ene-6,1′-cyclopropane]-3,11-dione,
2α-methyl-19α-fluoro-17,20:20,21-bismethylenedioxy-
  spiro[pregn-4-ene-6,1′-cyclopropane]-3,11-dione,
2α-methyl-16α-fluoro-17,20:20,21-bismethylenedioxy-
  spiro[pregn-4-ene-6,1′-cyclopropane]-3,11-dione,
2α-methyl-9α,16α-difluoro-17,20:20,21-bismethylene-
  dioxyspiro[pregn-4-ene-6,1′-cyclopropane]-
  3,11-dione,
16α-methyl-9α-fluoro-17,20:20,21-bismethylenedioxy-
  spiro[pregn-4-ene-6,1′-cyclopropane]-3,11-dione,
16β-methyl-9α-fluoro-17,20:20,21-bismethylenedioxy-
  spiro[pregn-4-ene-6,1′-cyclopropane]-3,11-dione,
2α,16α-dimethyl-9α-fluoro-17,20:20,21-bismethylene-
  dioxyspiro[pregn-4-ene-6,1′-cyclopropane]-
  3,11-dione,
2α,16β-dimethyl-9α-fluoro-17,20:20,21-bismethylene-
  dioxyspiro[pregn-4-ene-6,1′-cyclopropane]-
  3,11-dione, respectively, and the like.

Example 6

*11β,17α,2-trihydroxyspiro[pregn-4-ene-6,1′-
cyclopropane]-3,20-dione*

A mixture of 500 mg. of 11β-hydroxy-17,20:20,21-bismethylenedioxyspiro[pregn-4-ene-6,1′-cyclopropane] - 3-one and 20 ml. of 60% formic acid was stirred and heated inside a steam cone for 10 minutes while nitrogen was bubbled through the solution. The mixture was cooled quickly, poured into 100 ml. of ice and water containing 16 g. of sodium hydroxide and the product was extracted with warm ethyl acetate. The warm extract was washed with water, dried and concentrated in vacuo. Addition of chloroform to the residue caused crystallization of the 11β,17α,21-trihydroxyspiro[pregn - 4 - ene - 6,1′-cyclopropane]-3,20-dione as a chloroform solvate (infrared), M.P. 212–217° C. Recrystallization of this material from acetone gave 11β,17α,21-trihydroxyspiro[pregn-4-ene-6, 1′-cyclopropane]-3,20-dione, M.P. 213–216° C. dec.

Example 7

*17α,21-dihydroxyspiro[pregn-4-ene-6,1′-cyclo-
propane]-3,11,20-trione*

Substituting 17,20:20,21-bismethylenedioxyspiro[pregn-4-ene-6,1′-cyclopropane]-13,11-dione as starting material in place of 11β-hydroxy-17,20:20,21-bismethylenedioxyspiro[pregn-4-ene-6,1′-cyclopropane]-3-one in the procedure of Example 6 is productive of 17α,21-dihydroxyspiro[pregn-4-ene-6,1′-cyclopropane]-3,11,20-trione.

In the same manner substituting other compounds of Formulae VI and VII, for example, the compounds listed in Examples 4 and 5, is productive of the corresponding compounds of Formula VIII, such as 2α-methyl-11β,17α,21-trihydroxyspiro[pregn-4-ene-
  6,1′-cyclopropane]-3,20-dione,
9α-fluoro-11β,17α,21-trihydroxyspiro[pregn-4-ene-
  6,1′-cyclopropane]-3,20-dione,
9α-fluoro-16α-chloro-11β,17α,21-trihydroxyspiro-
  [pregn-4-ene-6,1′-cyclopropane]-3,20-dione,
16α-chloro-11β,17α,21-trihydroxyspiro[pregn-4-ene-
  6,1′-cyclopropane]-3,20-dione,
16β-chloro-11β,17α,21-trihydroxyspiro[pregn-4-ene-
  6,1′-cyclopropane]-3,20-dione,
16α-methoxy-11β,17α,21-trihydroxyspiro[pregn-4-ene-
  6,1′-cyclopropane]-3,20-dione,
16α-methyl-11β,17α,21-trihydroxyspiro[pregn-4-ene-
  6,1′-cyclopropane]-3,20-dione,
16β-methyl-11β,17α,21-trihydroxyspiro[pregn-4-ene-
  6,1′-cyclopropane]-3,20-dione,
2α-16α-dimethyl-11β,17α,21-trihydroxyspiro[pregn-4-
  ene-6,1′-cyclopropane]-3,20-dione,
2α-16β-dimethyl-11β,17α,21-trihydroxyspiro[pregn-
  4-ene-6,1′-cyclopropane]-3,20-dione,
2α-methyl-9α-fluoro-11β,17α,21-trihydroxyspiro[pregn-
  4-ene-6,1′-cyclopropane]-3,20-dione,
2α-methyl-16α-fluoro-11β,17α,21-trihydroxyspiro-
  [pregn-4-ene-6,1′-cyclopropane]-3,20-dione,
2α-methyl-9α,16α-difluoro-11β,17α,-21-trihydroxyspiro-
  [pregn-4-ene-6,1′-cyclopropane]-3,20-dione,
16α-methyl-9α-fluoro-11β,17α,21-trihydroxyspiro-
  [pregn-4-ene-6,1′-cyclopropane]-3,20-dione,
16β-methyl-9α-fluoro-11β,17α,21-trihydroxyspiro-
  [pregn-4-ene-6,1′-cyclopropane]-3,20-dione,
2α,16α-dimethyl-9α-fluoro-11β,17α,21-trihydroxyspiro-
  [pregn-4-ene-6,1′-cyclopropane]-3,20-dione,
2α,16β-dimethyl-9α-fluoro-11β,17α,21-trihydroxyspiro-
  [pregn-4-ene-6,1′-cyclopropane]-3,20-dione,
17α,21-dihydroxyspiro[pregn-4-ene-6,1′-cyclopropane]-
  3,20-dione, 2α-methyl-17α,21-dihydroxyspiro[pregn-4-ene-6,1'-cyclopropane]-3,20-dione,
16α-methyl-17α,21-dihydroxyspiro[pregn-4-ene-6,1'-cyclopropane]-3,20-dione,
16β-methyl-17α,21-dihydroxyspiro[pregn-4-one-6,1'-cyclopropane]-3,20-dione,
16α-fluoro-17α-21-dihydroxyspiro[pregn-4-ene-6,1'-cyclopropane]-3,20-dione,
16β-chloro-17α,21-dihydroxyspiro[pregn-4-ene-6,1'-cyclopropane]-3,20-dione,
16α-methoxy-17α,21-dihydroxyspiro[pregn-4-ene-6,1'-cyclopropane]-3,20-dione,
2α,16α-dimethyl-17α,21-dihydroxyspiro[pregn-4-ene-6,1'-cyclopropane]-3,20-dione,
2α,16β-dimethyl-17α,21-dihydroxyspiro[pregn-4-ene-6,1'-cyclopropane]-3,20-dione,
2α-methyl-16α-fluoro-17α,21-dihydroxyspiro[pregn-4-ene-6,1'-cyclopropane]-3,20-dione,
17α,21-dihydroxyspiro[pregn-4-ene-6,1'-cyclopropane]-3,11,20-trione,
2α-methyl-17α,21-dihydroxyspiro[pregn-4-ene-6,1'-cyclopropane]-3,11,20-trione,
9α-fluoro-17α,21-dihydroxyspiro[pregn-4-ene-6,1'-cyclopropane]-3,11,20-trione,
9α-fluoro-16α-chloro-17α,21-dihydroxyspiro[pregn-4-ene-6,1'-cyclopropane]-3,11,20-trione,
16α-chloro-17α,21-dihydroxyspiro[pregn-4-ene-6,1'-cyclopropane]-3,11,20-trione,
16β-chloro-17α,21-dihydroxyspiro[pregn-4-ene-6,1'-cyclopropane]-3,11,20-trione,
16α-methoxy-17α,21-dihydroxyspiro[pregn-4-ene-6,1'-cyclopropane]-3,11,20-trione,
16α-methyl-17α,21-dihydroxyspiro[pregn-4-ene-6,1'-cyclopropane]-3,11,20-trione,
16β-methyl-17α,21-dihydroxyspiro[pregn-4-ene-6,1'-cyclopropane]-3,11,20-trione,
2α,16α-dimethyl-17α,21-dihydroxyspiro[pregn-4-ene-6,1'-cyclopropane]-3,11,20-trione,
2α,16β-dimethyl-17α,21-dihydroxyspiro[pregn-4-ene-6,1'-cyclopropane]-3,11,20-trione,
2α-methyl-9α-fluoro-17α,21-dihydroxyspiro[pregn-4-ene-6,1'-cyclopropane]-3,11,20-trione,
2α-methyl-16α-fluoro-17α,21-dihydroxyspiro[pregn-4-ene-6,1'-cyclopropane]-3,11,20-trione,
2α-methyl-9α,16α-difluoro-17α,21-dihydroxyspiro[pregn-4-ene-6,1'-cyclopropane]-3,11,20-trione,
16α-methyl-9α-fluoro-17α,21-dihydroxyspiro-[pregn-4-ene-6,1'-cyclopropane]3,11,20-trione,
16β-methyl-9α-fluoro-17α,21-dihydroxyspiro[pregn-4-ene-6,1'-cyclopropane]-3,11,20-trione,
2α,16α-dimethyl-9α-fluoro-17α,21-dihydroxyspiro-[pregn-4-ene-6,1'-cyclopropane]-3,11,20-trione,
2α,16β-dimethyl-9α-fluoro-17α,21-dihydroxyspiro-[pregn-4-ene-6,1'-cyclopropane]-3,11,20-trione,
respectively, and the like.

EXAMPLE 8

*21-acetoxy-11β,17α-dihydroxyspiro[pregn-4-ene-6,1'-cyclopropane]-3,20-dione*

A mixture of 450 mg. of crude 11β,17α,21-trihydroxyspiro[pregn-4-ene-6,1'-cyclopropane]-3,20-dione, 4 ml. of pyridine, 8 ml. of methylene chloride and 4 ml. of acetic anhydride was stirred overnight at room temperature. The excess anhydride was hydrolyzed by the addition of ice and water and the product was extracted with methylene chloride. The extract was washed with dilute acid, dilute base, water, dried and concentrated in vacuo. The residue was chromatographed on 100 g. of silica gel which had been wet packed in 150 ml. of chloroform and 20 ml. of methanol. Elution with chloroform containing increasing proportions of absolute ethanol gave 100 mg. of 21-acetoxy-11β,17α-dihydroxyspiro[pregn-4-ene-6,1'-cyclopropane]-3,20-dione, after crystallization from ether, M.P. 181–182° C., and a second crop of 60 mg., M.P. 180–182° C. An analytical sample was recrystallized from ether to give 21-acetoxy-11β,17α-dihydroxyspiro[pregn-4-ene-6,1'-cyclopropane] - 3,20 - dione, M.P. 177–178° C.

$\lambda_{max}^{EtOH}$ 251 mμ ($\epsilon$=14,450), [α]$_D$+265°, c. 0.56 (CHCl$_3$)

*Analysis.*—Calcd. for $C_{25}H_{34}O_6$: C, 69.75; H, 7.96. Found: C, 69.57; H, 8.32.

In the same manner substituting other acid anhydrides or acid halides of organic carboxylic acids, among which are the hydrocarbon carboxylic acids of from 1 to 16 carbon atoms, inclusive, previously listed, is productive of the corresponding 21 - acyloxy - 11β,17α - dihydroxyspiro[pregn-4-ene-6,1'-cyclopropane]-3,20-dione,

EXAMPLE 9

*21-acetoxy-17α-hydroxyspiro[pregn-4-ene-6,1'-cyclopropane]-3,11,20-trione*

Substituting 17α,21 - dihydroxyspiro[pregn-4-ene-6,1'-cyclopropane]-3,11,20-trione as starting material in place of 11β, 17α,21-trihydroxyspiro[pregn-4-ene-6,1'-cyclopropane]-3,20-dione in the procedure of Example 8, is productive of 21-acetoxy-17α-hydroxyspiro[pregn-4-ene-6,1'-cyclopropane]-3,11,20-trione and other 21-acylates thereof.

In the same manner, following the procedure of Example 8, other compounds of Formula VIII, for example, those listed in Example 7, above, are converted to the corresponding 21-acylates of Formula IX, by reacting the selected free 21-alcohol with the apropriate acid anhydride or acid halide.

EXAMPLE 10

*11β,17α,21-trihydroxyspiro[pregna-1,4-diene-6,1'-cyclopropane]-3,20-dione*

Five 100 ml. portions of a medium in 250 ml. Erlenmeyer flasks, containing 1% glucose, 2% corn steep liquor (60% solids) and tap water are adjusted to a pH of 4.9. This medium is sterilized for 45 minutes at 15 p.s.i. pressure and inoculated with a 1 to 2 day vegetative growth of *Septomyxa affinis* A.T.C.C. 6737. The Erlenmeyer flasks are shaken at room temperature (about 26–28° C.) for a period of about 3 days. At the end of this period 500-ml. volume is used as an inoculum for 10 liters of the same glucose-corn steep liquor medium which in addition contains 5 ml. of an antifoam compound (a mixture of lard oil and octadecanol). The fermentor is placed into the water-bath, adjusted to about 28° C. and the contents stirred thoroughly at about 300 r.p.m. and aerated at a rate of about 0.1 liter of air per minute. After about 20 hours of incubation or when a good growth has been developed, 1.0 g. of 11β,17α,21-trihydroxyspiro-[pregn-4-ene-6,1'-cyclopropane]-3,20-dione plus 50 mg. of 3-ketobisnor-4-cholen-22-al dissolved in dimethylformamide is added and the incubation carried out at the same temperature (about 28° C.) and aeration until the conversion is essentially complete (final pH about 8.3). The mycelium is then filtered off and extracted with three 200-ml. portions of acetone. The beer is extracted with three 1-liter portions of methylene chloride and thereupon the acetone extracts and the extracts of the beer are combined, dried over anhydrous sodium sulfate and evaporated and the resulting residue chromatographed over a Florisil column which on elution with (1:1) methylene chloride-Skellysolve B hexanes containing increasing proportions of acetone from 1 to 50% and crystallization gives 11β,17α,21-trihydroxyspiro[pregna - 1,4 - diene-6,1'-cyclopropane]-3,20-dione.

Instead of Septomyxa, species of other genera such as Corynebacterium, Didymella, Calonectria, Alternaria, Colletotrichum, Cylindrocarpon, Ophiobolus, Fusarium, Listeria, Mycobacterium, Tricothecium, Leptosphaeria, Cucurbitaria, Nocardia, and enzymes of fungi of the family Tuberculariaceae can be used to introduce Δ¹-bond into the compounds of Formulae VIII and IX.

In the same manner substituting other compounds of Formula VIII, for example, the compounds listed in Example 7, is productive of the corresponding compounds of Formula X wherein R is hydrogen such as 2α-methyl-11β,17α,21 trihydroxyspiro[pregna-1,4-diene-6,1'-cyclopropane]-3,20-dione,
9α-fluoro-11β,17α,21-trihydroxyspiro[pregna-1,4-diene-6,1'-cyclopropane]-3,20-dione,
9α-fluoro-16α-chloro-11β,17α,21-trihydroxyspiro[pregna-1,4-diene-6,1'-cyclopropane]-3,20-dione,
16α-chloro-11β,17α,21-trihydroxyspiro[pregna-1,4-diene-6,1'-cyclopropane]-3,20-dione,
16β-chloro-11β,17α,21-trihydroxyspiro[pregna-1,4-diene-6,1'-cyclopropane]-3,20-dione,
16α-methoxy-11β,17α,21-trihyroxyspiro[pregna-1,4-diene-6,1'-cyclopropane]-3,20-dione,
16α-methyl-11β,17α,21-trihydroxyspiro[pregna-1,4-diene-6,1'-cyclopropane]-3,20-dione,
16β-methyl-11β,17α,21-trihydroxyspiro[pregna-1,4-diene-6,1'-cyclopropane]-3,20-dione,
2α,16α-dimethyl-11β,17α,21-trihydoxyspiro[pregna-1,4-diene-6,1'-cyclopropane]-3,20-dione,
2α,16β-dimethyl-11β,17α,21-trihydroxyspiro[pregna-1,4-diene-6,1'-cyclopropane]-3,20-dione,
2α-methyl-9α-fluoro-11β,17α,21-trihydroxyspiro[pregna-1,4-diene-6,1'-cyclopropane]-3,20-dione,
2α-methyl-16α-fluoro-11β,17α,21-trihydroxyspiro[pregna-1,4-diene-6,1'-cyclopropanel]-3,20-dione,
2α-methyl-16α-fluoro-11β,17α,21-trihydroxyspiro[pregna-spiro[pregna-1,4-diene-6,1'-cyclopropane]-3,20-dione,
16α-methyl-9α-fluoro-11β,17α,21-trihydroxy-spiro[pregna-1,4-diene-6,1'-cyclopropane]-3,20-dione,
16β-methyl-9α-fluoro-11β,17α,21-trihydroxy-spiro[pregna-1,4-diene-6,1'-cyclopropane]-3,20-dione,
2α,16α-dimethyl-9α-fluoro-11β,17α,21-trihydoxy-sprio[pregna-1,4-diene-6,1'-cyclopropane]-3,20-dione,
2α,16β-dimethyl-9α-fluoro-11β,17α,21-trihydroxy-spiro[pregna-1,4-diene-6,1'-cyclopropane]-3,20-dione,
17α,21-dihydroxyspiro[pregna-1,4-diene-6,1'-cyclopropane]-3,20-dione,
2α-methyl-17α,21-dihydroxyspiro[pregna-1,4-diene-6,1'-cyclopropane]-3,20-dione,
16α-methyl-17α,21-dihydroxyspiro[pregna-1,4-diene-6,1'-cyclopropane]-3,20-dione,
16β-methyl-17α,21-dihydroxyspiro[pregna-1,4-diene-6,1'-cyclopropane]-3,20-dione,
16α-fluoro-17α,21 dihydroxyspiro[pregna-1,4-diene-6,1'-cyclopropane]-3,20-dione,
16β-chloro-17α,21-dihydroxyspiro[pregna-1,4-diene-6,1'-cyclopropane]-3,20-dione,
16α-methoxy-17α,21-dihydroxyspiro[pregna-1,4-diene-6,1'-cyclopropane]-3,20-dione,
2α,16α-dimethyl-17α,21-dihydroxyspiro[pregna-1,4-diene-6,1'-cyclopropane]-3,20-dione,
2α,16β-dimethyl-17α,21-dihydroxyspiro[pregna-1,4-diene-6,1'-cyclopropane]-3,20-dione,
2α-methyl-16α-fluoro-17α,21-dihydroxyspiro[pregna-1,4-diene-6,1'-cyclopropane]-3,20-dione,
17α,21-dihydroxyspiro[pregna-1,4-diene-6,1'-cyclopropane]-3,11,20-trione,
2α-methyl-17α,21-dihydroxyspiro[pregna-1,4-diene-6,1'-cyclopropane]-3,11,20-trione,
9α-fluoro-17α,21-dihydroxyspiro[pregna-1,4-diene-6,1'-cyclopropane]-3,11,20-trione,
9α-fluoro-16α-chloro-17α,21-dihydroxyspiro[pregna-1,4-diene-6,1'-cyclopropane]-3,11,20-trione,
16α-chloro-17α,21-dihydroxyspiro[pregna-1,4-diene-6,1'-cyclopropane]-3,11,20-trione,
16β-chloro-17α,21-dihydroxyspiro[pregna-1,4-diene-6,1'-cyclopropane]-3,11,20-trione,
16α-methoxy-17α,21-dihydroxyspiro[pregna-1,4-diene-6,1'-cyclopropane]-3,11,20-trione,
16α-methyl-17α,21-dihydroxyspiro[pregna-1,4-diene-6,1'-cyclopropane]-3,11,20-trione,
16β-methyl-17α,21-dihydroxyspiro[pregna-1,4-diene-6,1'-cyclopropane]-3,11,20-trione,
2α,16α-dimethyl-17α,21-dihydroxyspiro[pregna-1,4-diene-6,1'-cyclopropane]-3,11,20-trione,
2α,16β-dimethyl-17α,21-dihydroxyspiro[pregna-1,4-diene-6,1'-cyclopropane]-3,11,20-trione,
2α-methyl-9α-fluoro-17α,21-dihydroxyspiro[pregna-1,4-diene-6,1'-cyclopropane]-3,11,20-trione,
2α-methyl-16α-fluoro-17α,21-dihydroxyspiro[pregna-1,4-diene-6,1'-cyclopropane]-3,11,20-trione,
2α-methyl-9α,16α-difluoro-17α,21-dihydroxyspiro[pregna-1,4-diene-6,1'-cyclopropane]-3,11,20-trione,
16α-methyl-9α-fluoro-17α,21-dihydroxyspiro[pregna-1,4-diene-6,1'-cyclopropane]-3,11,20-trione,
16β-methyl-9α-fluoro-17α,21-dihydroxyspiro[pregna-1,4-diene-6,1'-cyclopropane]-3,11,20-trione,
2α,16α-dimethyl-9α-fluoro-17α,21-dihydroxyspiro[pregna-1,4-diene-6,1'-cyclopropane]-3,11,20-trione,
2α,16β-dimethyl-9α-fluoro-17α,21-dihydroxyspiro[pregna-1,4-diene-6,1'-cyclopropane]-3,11,20-trione, respectively, and the like.

EXAMPLE 11

*21-acetoxy-11β,17α-dihydroxyspiro[pregna-1,4-diene-6,1'-cyclopropane]3,20-dione*

A mixture of 500 mg. of 17α,11β,21-trihydroxyspiro[pregna-1,4-diene-6,1'-cyclopropane]-3,20-dione, 5 ml. of pyridine, 10 ml. of methylene chloride and 5 ml. of acetic anhydride is stirred at room temperature (about 25° C.) overnight. The excess anhydride is then hydrolyzed by the addition of ice and water and the product is extracted with methylene chloride. The extract is washed with dilute acid, dilute base, water, dried and concentrated in vacuo. The residue thus obtained is chromatographed on silica gel in the same manner as disclosed in Example 6, above to give 21-acetoxy-11β,17α-dihydroxyspiro[pregna - 1,4 - diene-6,1'-cyclopropane] 3,20-dione.

In the same manner substituting other acid anhydrides or acid halides of organic carboxylic acids, among which are hydrocarbon carboxylic acids of from 1 to 16 carbon atoms, inclusive, previously listed, is productive of the corresponding 21-acyloxy - 11β,17α - dihydroxyspiro [pregna-1,4-diene-6,1'-cyclopropane]-3,20-dione.

In the same manner following the procedure of Example 11, other compounds of Formula X, wherein R is hydrogen, for example the compounds prepared and listed in Example 10, are converted to the corresponding 21-acylates of Formula X, wherein R is acyl, by reacting the selected free 21-hydroxy compound with the appropriate acid anhydride or acid halide.

EXAMPLE 12

*21-acetoxy-17-hydroxyspiro[pregna-1,4-diene-6,1'-cyclopropane]-3,11,20-trione*

A mixture of 100 mg. of 21-acetoxy-17α-hydroxyspiro-[pregn-4-ene-6,1'-cyclopropane]-3,11,20-trione in about 6 ml. of tertiary butyl alcohol and 0.55 ml. of acetic acid is heated together with 30 mg. of selenium dioxide to approximately 75° C. under stirring for a period of about 24 hours. Thereafter another 30 mg. portion of selenium dioxide is added and the mixture heated to 75° C. under continuous stirring for an additional period of 24 hours. The mixture is then cooled, filtered to remove the selenium dioxide and evaporated. The residue is chromatographed on Florisil and recrystallized from acetone-Skellysolve B hexanes to give 21-acetoxy-17α-hydroxyspiro[pregna - 1,4 - diene-6,1'-cyclopropane]-3,11,20-trione.

In the same manner substituting in Example 12 other compounds of Formula IX as starting material in place of 21 - acetoxy-17α-hydroxyspiro[pregn-4-ene-6,1'-cyclo-

EXAMPLE 13

*11β,17α,21-trihydroxyspiro[pregn-4-eno[2,3-d-]pyrazole-6,1'-cyclopropane]-20-one*

A solution of 1.35 g. of 11β-hydroxy-17,20:20,21-bismethylenedioxyspiro[pregn - 4 - ene-6,1'-cyclopropane]-3-one in dry benzene is treated with 1 ml. of freshly distilled ethyl formate at room temperature. The air in the system is replaced with nitrogen and 560 mg. of sodium hydride (as a 58% dispersion in mineral oil) is added. The system is again evacuated and filled with nitrogen, and the mixture is stirred at room temperature overnight. The mixture is poured slowly and cautiously into an excess of a saturated aqueous solution of sodium dihydrogen phosphate and the product is extracted four times with benzene. The organic extracts are washed three times with water and dried over sodium sulfate. Removal of the solvent gives the crude product which, if necessary, is dissolved in ether and purified as the sodium salt by extraction into a 1% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 11β-hydroxy - 2 - hydroxymethylene-17,20:20,21-bismethylenedioxyspiro[pregn - 4 - ene-6,1'-cyclopropane]-3-one.

The 11β-hydroxy-2-hydroxymethylene-17,20:20,21-bismethylenedioxyspiro[pregn - 4 - ene-6,1'-cyclopropane]-3-one, thus obtained is then dissolved in absolute ethanol and treated with a solution of 0.16 ml. of hydrazine dissolved in 0.16 ml. of absolute ethanol. The mixture is refluxed in a nitrogen atmosphere for about 45 minutes and then evaporated to dryness under reduced pressure. The residue is washed three times with cold water and the resulting solid is dried at 80° C. for 1 hour in high vacuum to give 11β-hydroxy-17,20:20,21-bismethylenedioxyspiro[pregn - 4 - eno[2,3-d]-pyrazole-6,1'-cyclopropane].

The product thus obtained, is heated in a steam bath with about 25 ml. of 60% aqueous solution of formic acid for about 30 minutes. The excess reagent is removed under vacuum using a water bath at about 50° C. as a source of heat. The residue is flushed with n-hexane and dried at about 60° C. in vacuo to give 11β,17α,21-trihydroxyspiro[pregn-4-eno[2,3-d]pyrazole - 6,1' - cyclopropane]-20-one.

In the same manner substituting as starting material in Example 13, other compound of Formula XI, for example the compounds prepared and listed in Examples 4 and 5 is productive of the corresponding pyrazoles of Formulae XV and XVI, wherein R₃ is hydrogen. The following conversions are representative:

16β - methyl - 11β - hydroxy - 17,20:20,21 - bismethylenedioxyspiro[pregn - 4 - en - 6,1' - cyclopropane] - 20-one to 16β - methyl - 11β,17α,21 - trihydroxyspiro[pregn-4 - eno - [2,3 - d]pyrazole - 6,1' - cyclopropane] - 20-one, 17,20:20,21 - bismethylenedioxyspiro[pregn - 4 - ene-6,1' - cyclopropane] - 3 - one to 17α,21 - dihydroxyspiro[pregn - 4 - eno - [2,3-d]pyrazole - 6,1' - cyclopropane]-20-one, 16α - methyl - 17,20:20,21 - bismethylenedioxyspiro[pregn - 4 - ene - 6,1' - cyclopropane] - 3 - one to 16α-methyl - 17α,21 - dihydroxyspiro[pregn - 4 - eno[2,3-d]pyrazole-6,1'-cyclopropane]-20-one, 17,20:20,21 - bismethylenedioxyspiro[pregn - 4 - ene-6,1' - cyclopropane] - 3,11 - dione to 17α,21 - dihydroxyspiro[pregn - 4 - eno - [2,3 - d]pyrazole - 6,1' - cyclopropane]-11,20-dione, 9α - fluoro - 17,20:20,21 - bismethylenedioxyspiro[pregn - 4 - ene - 6,1' - cyclopropane] - 3,11 - dione to 9α-fluoro - 17α,21 - dihydroxyspiro[pregn - 4 - eno[2,3 - d]pyrazole-6,1'-cyclopropane]-11,20-dione, and the like.

EXAMPLE 14

*N-phenyl-11β,17α,21-trihydroxyspiro[pregn-4-eno[2,3-d]pyrazole-6,1'-cyclopropane]-20-one*

A mixture of 1 g. of 11β-hydroxy-2-hydroxymethylene-17,20:20,21 - bismethylenedioxyspiro[pregn - 4 - ene-6,1'-cyclopropane]-3-one, and 2 ml. of phenylhydrazine is dissolved in ethanol by heating under nitrogen. The solution is then allowed to stand under nitrogen at room temperature overnight. Acetic acid (4 ml.) is added and the mixture is allowed to stand for another 4 hours. The reaction mixture is then diluted with ethyl acetate or chloroform and washed with dilute base and water. The ethyl acetate extract is then chromatographed on acid washed alumina to give N-phenyl-11β-hydroxy-17,20:20,21-bismethylenedioxyspiro[pregn - 4 - eno[2,3 - d]pyrazole-6,1'-cyclopropane]. A small amount of isomeric N-phenyl - 11β - hydroxy - 17,20:20,21 - bismethylenedioxyspiro[pregn-4-eno[3,2-c]pyrazole-6,1'-cyclopropane] can be isolated by additional chromatography of the mother liquors.

A 100-mg. quantity of n-phenyl-11β-hydroxy-17,20:20,21 - bismethylenedioxyspiro[pregn - 4 - eno[2,3 - d]pyrazole-6,1'-cyclopropane] is heated on a steam bath with about 3 ml. of a 60% aqueous solution of formic acid for 35 minutes. The excess reagent is removed under vacuum using a water bath at about 50° C. The residue is thoroughly washed with water and dried to give N-phenyl - 11β,17α,21 - trihydroxyspiro[pregn - 4 - eno[2,3-d]pyrazole-6,1'-cyclopropane]-20-one.

Similarly the bismethylenedioxy moiety is likewise removed from the corresponding [3,2-c] isomer to give N-phenyl - 11β,17α,21 - trihydroxyspiro[pregn - 4 - eno[3,2-c]pyrazole-6,1'-cyclopropane]-20-one.

In the same manner the other compounds of Formulae XV and XVI wherein R₃ is alkyl, cycloalkyl, aralkyl, aryl, heterocyclic nucleus or substituted derivatives thereof, are prepared by substituting in Example 14 the appropriate monosubstituted hydrazine, among which are those hereinbefore listed to produce a mixture of [2,3-c] and [3,2-d]-pyrazoles. The following conversions showing the predominant isomers obtained are representative:

9α - fluoro - 11β - hydroxy - 17,20:20,21 - bismethylenedioxyspiro[pregn - 4 - ene - 6,1' - cyclopropane] - 3-one with ethylhydrazine to give N-ethyl-9α-fluoro-11β,17α,21 - trihydroxyspiro[pregn - 4 - eno - [3,2-c]pyrazole-6,1'-cyclopropane]-20-one, 17,20:20,21 - bismethylenedioxyspiro[pregn - 4 - ene-6,1' - cyclopropane] - 3,11 - dione with p-chlorophenylhydrazine to give N-(p-chlorophenyl)-17α,21-dihydroxyspiro[pregn - 4 - eno[2,3-d]pyrazole - 6,1' - cyclopropane]-11,20-dione, 17,20:20,21 - bismethylenedioxyspiro[pregn - 4 - eno-6,1'-cyclopropane]-3-one with β-hydroxyethylhydrazine to give N-(β-hydroxyethyl)-17α,21-dihydroxyspiro[pregn-4-eno[3,2-c]pyrazole-6,1'-cyclopropane]-20-one, 16α - methyl - 11β - hydroxy - 17,20:20,21 - bismethylenedioxyspiro[pregn-4-ene-6,1'-cyclopropane]-3-one with benzylhydrazine to give N-benzyl-16α-methyl-11β,17α,21-trihydroxyspiro[pregn - 4 - eno - [3,2 - c]pyrazole - 6,1'-cyclopropane]-20-one, and the like.

EXAMPLE 15

*N - (p - fluorophenyl) - 11β,17α,21 - trihydroxyspiro-[pregn - 4 - eno[2,3-d]pyrazole - 6,1' - cyclopropane]-20-one and N(p-fluorophenyl)-11β,17α,21-trihydroxyspiro[pregn - 4 - eno[3,2-c]pyrazole - 6,1' - cyclopropane]-20-one*

A mixture of 4.0 g. of 53% sodium hydride (oil suspension), 200 ml. of dry benzene, 10.0 g. of 11β-hydroxy- 17,20:20,21 - bismethylenedioxyspiro[pregn - 4 - ene - 6, 1' - cyclopropane] - 3 - one, 10 ml. of ethyl formate and 0.5 ml. of absolute ethanol is stirred under a nitrogen atmosphere for 10–24 hours at room temperature. Methanol (10 ml.) is added cautiously followed about 30 minutes later by 300 ml. of water and 60 ml. of methanol. The alkaline layer is washed once with benzene and the aqueous layer is then acidified with a slight excess of 3 N hydrochloric acid. The precipitate thus obtained is collected by filtration, dissolved in benzene, dried and concentrated in vacuo to give 11β-hydroxy-2-hydroxymethylene - 17,20:20,21 - bismethylenedioxyspiro[pregn-4-ene-6,1'-cyclopropane]-3-one as a crystalline residue sufficiently pure to be used directly in the next step.

The hydroxymethylene derivative thus obtained is dissolved in tetrahydrofuran and a slight excess (1.05 molecular equivalent) of ethereal diazomethane is added dropwise with stirring. After 5–30 minutes, the solvents are removed in vacuo to give 11β-hydroxy-2-methoxymethylene - 17,20:20,21 - bismethylenedioxyspiro-[pregn-4-ene-6,1'-cyclopropane]-3-one as a crystalline solid, sufficiently pure to be used directly in the next step.

A mixture of 4.6 g. of 11β-hydroxy-2-methoxymethylene - 17,20:20,21 - bismethylenedioxyspiro[pregn-4-ene-6,1'-cyclopropane]-3-one, 1.64 g. of p-fluorophenylhydrazine and 125 ml. of absolute ethanol is stirred at room temperature for 15 hours, at which time 1 ml. of glacial acetic acid is added. The mixture is then refluxed for 1–4 hrs., cooled and diluted with 100 ml. of aqueous 1% sodium bicarbonate solution. The precipitated product thus obtained is collected on a filter and washed with water to give a mixture of N-(p-fluorophenyl)-11β-hydroxy-17,20:20,21 - bismethylenedioxyspiro[pregn-4-eno[2,3-d]pyrazole-6,1'-cyclopropane] and N-(p-fluorophenyl)-11β-hydroxy - 17,20:20,21 - bismethylenedioxyspiro[pregn-4-eno[3,2-c]pyrazole-6,1'-cyclopropane].

The products thus obtained are separated as follows: A column is prepared from a slurry of 500 g. of silica gel (0.05–0.2 mm., Brinkmann Instruments Inc., Great Neck, N.Y.) and 900 ml. of methylene chloride containing 50 ml. of methanol. The steroid mixture is placed on the column in the minimum amount of methylene chloride and elution is carried out with methylene chloride containing increasing amounts of methanol (up to 10%) by gradient chromatography. Those fractions corresponding to pure N-(p-fluorophenyl)-11β-hydroxy-17,20:20,21-bismethylenedioxyspiro[pregn-4-eno[2,3-d]pyrazole - 6,1'-cyclopropane], (as determined by thin-layer chromatography and/or spectroscopic means (UV or NMR)) are combined as are those fractions corresponding to pure N-(p - fluorophenyl)-11β-hydroxy-17,20:20,21-bismethylenedioxyspiro[pregn-4-eno[3,2 - c]pyrazole-6,1'-cyclopropane]. The products are then further purified by crystallization from an organic solvent such as ethanol or methanol.

The bismethylenedioxy moiety is removed in the same manner as disclosed in Example 13 or 14, above, to give N-(p - fluorophenyl)-11β,17α,21-trihydroxyspiro[pregn-4-eno[2,3-d]pyrazole-6,1'-cyclopropane]-20-one and N-(p-fluorophenyl)-11β,17α-21-trihydroxyspiro[pregn - 4 - eno [3,2-c]pyrazole-6,1'-cyclopropane]-20-one.

In the same manner the other compounds of Formulae XV and XVI wherein R₃ is alkyl, cycloalkyl, aralkyl, aryl, heterocyclic nucleus or substituted derivatives thereof, are prepared by substituting in Example 14 the appropriate monosubstituted hydrazine, among which are those hereinbefore listed. The following conversions are representative:

11β - hydroxy - 17,20:20,21 - bismethylenedioxyspiro [pregn-4-ene-6,1'-cyclopropane] - 3 - one with methylhydrazine to give N - methyl - 11β,17α,21 - trihydroxyspiro [pregn-4-eno[3,2-c]pyrazole - 6,1' - cyclopropane]-20-one and N-methyl-11β,17α,21-trihydroxyspiro[pregn - 4 - eno [2,3-d]pyrazole-6,1'-cyclopropane]-20-one;

17,20:20,21 - bismethylenedioxyspiro[pregn-4-ene-6,1'-cyclopropane]-3,11-dione with phenylhydrazine to give N-phenyl-17α,21-dihydroxyspiro[pregn-4-eno[3,2 - c]pyrazole-6,1'-cyclopropane]11,20-dione and N-phenyl-17α,21-dihydroxyspiro[pregn - 4 - eno[2,3-d]pyrazole-6,1'-cyclopropane]-11,20-dione;

17,20:20,21 - bismethylenedioxydioxy[pregn-4-ene-6,1'-cyclopropane]-3-one with p-nitrophenylhydrazine to give N-(p-nitrophenyl)-17α,21-dihydroxyspiro[pregn - 4 - eno [3,2-c]pyrazole-6,1'-cyclopropane]-20-one and N-(p-nitrophenyl)-17α,21-dihydroxyspiro[pregn - 4 - eno[2,3-d]pyrazole-6,1'-cyclopropane]-20-one;

16α-methyl-11β-hydroxy - 17,20:20,21 - bismethylenedioxyspiro[pregn-4-ene-6,1'-cyclopropane] - 3 - one with benzylhydrazine to give N-benzyl-16α-methyl-11β,17α,21-trihydroxyspiro[pregn-4-eno[3,2-c]pyrazole - 6,1' - cyclopropane]-20-one and N-benyl-16α-methyl-11β,17α,21-trihydroxyspiro[pregn-4-eno[2,3 - d]pyrazole-6,1'-cyclopropane]-20-one;

9α-fluoro-11β-hydroxy-17,20:20,21 - bismethylenedioxyspiro[pregn-4-ene-6,1'-cyclopropane]-3-one with p-fluorophenylhydrazine to give N-(p-fluorophenyl)-9α-fluoro-11β,17α,21-trihydroxyspiro[pregn-4-eno[3,2 - c]pyrazole-6,1'-cyclopropane]-11,20-dione and N-(p-fluorophenyl)-9α-fluoro-11β,17α,21-trihydroxyspiro[pregn-4-eno[2,3 - d] pyrazole-6,1'-cyclopropane]-11,20-dione, and the like.

EXAMPLE 16

*21-acetoxy-11β,17α-dihydroxyspiro[pregn-4-eno [3,2-c]pyrazole-6,1'-cyclopropane]-20-one*

To a solution of 10 g. of 11β,17α,21-trihydroxyspiro [pregn-4-eno[2,3-d]pyrazole-6,1'-cyclopropane]-20-one in pyridine is added an excess of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford the N-acetyl-21-acetoxy derivative of 11β,17α,21-trihydroxyspiro[pregn-4-eno[2,3 - d]pyrazole-6,1'-cyclopropane]-20-one which is isolated by the addition of water and the precipitate thus obtained, is collected on a filter washed with water and dried.

A solution of 5 g. of the N-acetyl-21-acetoxy compound thus obtained, in 60 ml. of 80% v./v.) acetic acid is refluxed for 1.5 hours. This solution is then diluted with 400 ml. of ice-water and extracted with ethyl acetate. The ethyl acetate extract is washed with water and with saturated sodium bicarbonate solution, dried, and evaporated to dryness in vacuo. Recrystallization of the resulting product affords 21-acetoxy-11β,17α-dihydroxyspiro[pregn - 4 - eno [2,3-d]pyrazole-6,1'-cyclopropane]-20-one.

In accordance with the above procedure, but using an equivalent amount of another acylating agent, e.g., those hereinbefore listed, in place of acetic anhydride there is obtained the corresponding 21-acyloxy-11β,17α-dihydroxyspiro[pregn-4-eno[2,3 - d]pyrazole-6,1'-cyclopropane]-20-one.

In the same manner the other compounds represented by Formulae XV and XVI, wherein R is hydrogen, can be substituted as starting material in Example 16 in place of 11β,17α,21-trihydroxyspiro[pregn-4-eno[2,3 - d]pyrazole-6,1'-cyclopropane]-20-one, and using acetic anhydride or another acylating agent such as those hereinbefore listed in place thereof, is productive of the corresponding 21-acyloxy compounds of Formulae XV and XVI, wherein R₃ is hydrogen. The following conversions are representative:

11β,17α,21-trihydroxyspiro[pregn - 4 - eno[2,3-d]pyrazole-6,1'-cyclopropane] with propionic anhydride to give 21 - propionyloxy - 11β,17α - dihydroxyspiro[pregn-4-eno[2,3-d]pyrazole 6,1'-cyclopropane]-20-one;

17α,21-dihydroxyspiro[pregn - 4 - eno[2,3-d]pyrazole-6,1'-cyclopropane] with butyric anhydride to give 21-butyryloxy-17α-hydroxyspiro[pregn-4-eno[2,3 - d]pyrazole-6,1'-cyclopropane]-20-one;

16α-methyl-17α,21-dihydroxyspiro[pregn-4-eno[2,3 - d]pyrazole-6,1'-cyclopropane] with succinic anhydride to give 21-hemisuccinyloxy-16α-methyl - 17α - hydroxyspiro[pregn-4-eno[2,3-d]pyrazole-6,1'-cyclopropane]-20-one;

17α,21-dihydroxyspiro[pregn - 4 - eno[2,3-d]pyrazole-6,1'-cyclopropane]-11,20-dione with acetyl chloride to give 21-acetoxy-17α-hydroxyspiro[pregn - 4 - eno[2,3-d]pyrazole-6,1'-cyclopropane]-11,20-dione;

9α-fluoro-17α,21-dihydroxyspiro[pregn - 4 - eno[2,3-d]pyrazole-6,1'-cyclopropane]-11,20-dione with benzoyl chloride to give 21-benzoyloxy-9α-fluoro-17α-hydroxyspiro[pregn - 4 - eno[2,3-d]pyrazole-6,1'-cyclopropane]-11,20-dione;

and the like.

EXAMPLE 17

*N-(p-fluorophenyl) - 21 - acetoxy - 11β,17α - dihydroxyspiro[pregn - 4 - eno[2,3-d]pyrazole - 6,1' - cyclopropane]-20-one*

To a solution of 100 mg. of N-(p-fluorophenyl)-11β,17α,21-trihydroxyspiro[pregn - 4 - eno[2,3-d]pyrazole-6,1'-cyclopropane]-20-one is added an excess of acetic anhydride containing an equal amount of pyridine. The mixture is allowed to stand overnight at room temperature. The solvent is then removed from the reaction mixture by evaporation in vacuo and the crude product thus obtained, is dissolved in a minimum amount of methylene chloride, absorbed on a column of silica gel, and eluted successively with methylene chloride and with methylene chloride containing increasing proportions of ether. The appropriate eluate fractions, determined by thin layer chromatography and/or spectroscopic means (UV or NMR), are combined and recrystallized from methanol to give N-(p-fluorophenyl)-21-acetoxy - 11β,17α-dihydroxyspiro[pregn - 4 - eno[2,3-d]pyrazole-6,1'-cyclopropane]-20-one which can be further purified by additional crystallization from methanol.

In accordance with the above procedure, but using another acylating agent in place of acetic anhydride e.g., those hereinbefore listed, there is obtained the corresponding N-(p-fluorophenyl) - 21 - acyloxy-11β,17α-dihydroxyspiro[pregn - 4 - eno[2,3-d]-pyrazole-6,1'-cyclopropane]-20-one.

In the same manner substituting other compounds of Formulae XV and XVI, wherein $R_3$ is acyl, alkyl, cycloalkyl, aralkyl, aryl, a heterocyclic nucleus, or a substituted derivative thereof, and R is hydrogen, in place of N-(p-fluorophenyl) - 11β,17α,21 - trihydroxyspiro[pregn-4 - eno[2,3-d]pyrazole-6,1'-cyclopropane]-20-one in Example 17 and using acetic anhydride or another acylating agent in place thereof, such as those hereinbefore listed, is productive of the corresponding 21-acylates of Formula XV and XVI wherein $R_3$ is other than hydrogen as defined above. For example the 21-acylates of the N-substituted pyrazoles prepared in Examples 14 and 15 above, such as N-ethyl-21-acetoxy-9α-fluoro-11β,17α-dihydroxyspiro [pregn-4-eno[3,2-c]pyrazole-6,1'cyclopropane]-20-one, N-(p-chlorophenyl)-21-propionyloxy-17α-dihydroxyspiro[pregn-4-eno[2,3-d]pyrazole-6,1'-cyclopropane]-11,20-dione, N-(β-hydroxyethyl)-21-valeryloxy-17α-hydroxyspiro[pregn-4-eno[3,2-c]pyrazole-6,1'-cyclopropane]-20-one, N-benzyl-16α-methyl-21-phenylacetoxy-11β,17α-dihydroxyspiro[pregn-4-eno[3,2-c]pyrazole-6,1'-cyclopropane]-20-one, N-(p-fluorophenyl)-21-acetoxy-11β,17α-dihydroxyspiro[pregn-4-eno[3,2-c]pyrazole-6,1'-cyclopropane]-20-one, N-methyl-21-acetoxy-11β,17α-dihydroxyspiro[pregn-4-eno[3,2-c]pyrazole-6,1',-cyclopropane]-20-one;

N-phenyl-21-propionyloxy-17α-hydroxyspiro[pregn-4-eno-[2,3-d]pyrazole-6,1'-cyclopropane]-11,20-dione, N-(p-nitrophenyl)-21-butyryloxy-17α-hydroxyspiro[pregn-4-eno[3,2-c]pyrazole-6,1'-cyclopropane]-20-one, N-benzyl-16α-methyl-21-hemisuccinyloxy-11β,17α-dihydroxyspiro[pregn-4-eno[3,2-c]pyrazole-6,1'-cyclopropane]-20-one, N-(p-fluorophenyl)-9α-fluoro-21-benzoyloxy-11β,17α-dihydroxyspiro[preg-4-eno[2,3-d]pyrazole-6,1'-cyclopropane]-20-one, and the like.

I claim:
1. A compound of the formula:

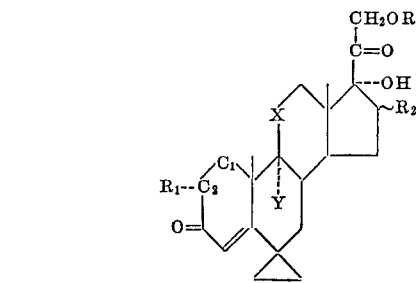

wherein R is selected from the group consisting of hydrogen and the acyl radical of a hydrocarbon carboxylic acid of 1 to 16 carbon atoms, inclusive; $R_1$ is selected from the group consisting of hydrogen and methyl; $R_2$ is selected from the group consisting of hydrogen, methyl, fluorine, chlorine and methoxy; X is selected from the group consisting of $>CH_2$, $>C=O$, and

Y is selected from the group consisting of hydrogen and fluorine; —$C_1$—$C_2$— is a divalent radical selected from the group consisting of —$CH_2$—$CH_2$— and —CH=CH—, and wherein when X is $>CH_2$, Y is limited to hydrogen.

2. 11β,17α,21 - trihydroxyspiro[pregn - 4 - ene - 6,1'-cyclopropane]-3,20-dione.

3. 17α,21-dihydroxyspiro[pregn - 4 - ene-6,1' - cyclopropane]-3,11,20-trione.

4. 21-acetoxy-11β,17α-dihydroxyspiro[pregn - 4 - ene-6,1'-cyclopropane]-3,20-dione.

5. 21 - acetoxy - 17α - hydroxyspiro[pregn-4-ene-6,1'-cyclopropane]-3,11,20-trione.

6. 11β,17α,21 - trihydroxyspiro[pregna-1,4-diene-6,1'-cyclopropane]-3,20-dione.

7. 17α,21 - dihydroxyspiro[pregna-1,4-diene-6,1'-cyclopropane]-3,11,20-trione.

8. 21' - acetoxy-11β,17α-dihydroxyspiro[pregna-1,4-diene-6,1'-cyclopropane]-3,20-dione.

9. 21 - acetoxy - 17α-hydroxyspiro[pregna-1,4-diene-6,1'-cyclopropane]-3,11,21-trione.

10. A compound selected from the class consisting of compounds of the formulae:

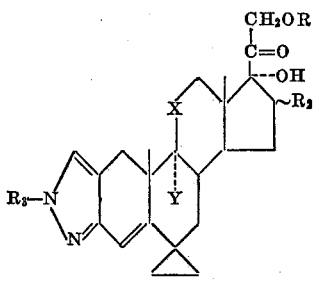

and

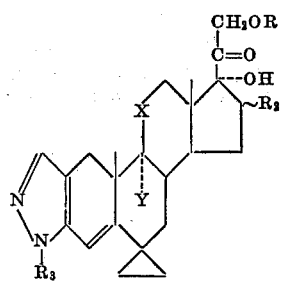

wherein R is selected from the group consisting of hydrogen and the acyl radical of a hydrocarbon carboxylic acid of 1 to 16 carbon atoms, inclusive; $R_2$ is selected from the group consisting of hydrogen, methyl, fluorine, chlorine, and methoxy; $R_3$ is selected from the group consisting of hydrogen, the acyl radical of a hydrocarbon carboxylic acid as defined above, an alkyl radical of 1 to 8 carbon atoms, inclusive, a cycloalkyl radical of 3 to 8 carbon atoms, inclusive, an aralkyl radical of 7 to 13 carbon atoms, inclusive, an aryl radical of 6 to 12 carbon atoms, inclusive, heterocyclic nucleus of 4 to 9 carbon atoms, inclusive, and substituted derivatives thereof; X is selected from the group consisting of $>CH_2$, $>C=O$, and

Y is selected from the group consisting of hydrogen and fluorine; and wherein when $X_1$ is $>CH_2$, Y is limited to hydrogen.

11. A compound of the formula:

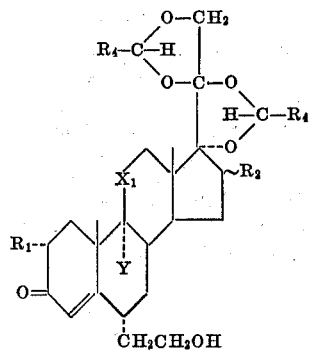

wherein $R_1$ is hydrogen or methyl; $R_2$ is selected from the group consisting of hydrogen, methyl, fluorine, chlorine or methoxy; $R_4$ is selected from the group consisting of hydrogen, and an alkyl radical of 1 to 8 carbon atoms, inclusive; $X_1$ is selected from the group consisting of $>CH_2$ and

Y is selected from the group consisting of hydrogen and fluorine; and wherein when $X_1$ is $>CH_2$, Y is limited to hydrogen.

12. 11β - hydroxy - 6α-(2'-hydroxyethyl)-17,20:20,21-bismethylene-dioxypregn-4-en-3-one.

13. A compound of the formula:

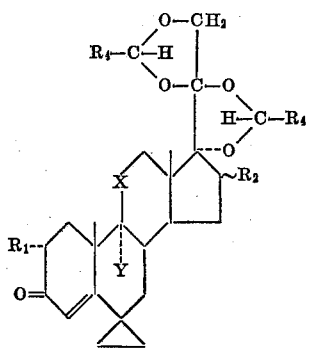

wherein $R_1$ is selected from the group consisting of hydrogen and methyl; $R_2$ is selected from the group consisting of hydrogen, methyl, fluorine, chlorine, or methoxy; $R_4$ is selected from the group consisting of hydrogen and an alkyl radical of 1 to 8 carbon atoms, inclusive; X is selected from the group consisting of $>CH_2$, $>C=O$, and

Y is selected from the group consisting of hydrogen and fluorine; and wherein when X is $>CH_2$, Y is limited to hydrogen.

14. 11β - hydroxy - 17,20:20,21-bismethylenedioxy-spiro[pregn-4-ene-6,1'-cyclopropane]-3-one.

15. The process which comprises treating a 17α,20:20,21 - bis-alkylidenedioxy-6α-(2'-hydroxyethyl)-pregn-4-en-3-one with a sulfonic acid halide and subjecting the 17α,20:20,21 - bisalkylidenedioxy - 6α - (2'-sulfonyloxyethyl)-pregn-4-en-3-one so obtained to treatment under basic conditions to produce the corresponding 17,20:20,21-bis-alkylenedioxyspiro[pregn - 4-ene - 6,1'-cyclopropane]-3-one.

16. The process which comprises treating a 17α,20:20,21 - bisalkylidenedioxy - 6α-(2'-hydroxyethyl)pregn-4-en-3-one with a sulfonic acid halide; subjecting the 17α,20:20,21 - bisalkylidenedioxy - 6α - (2'-sulfonyloxyethyl)-pregn-4-en-3-one so obtained to treatment under basic conditions to produce the corresponding 17,20:20,21-bis-alkylidenedioxyspiro[pregn - 4-ene - 6,1'-cyclopropane]-3-one, and hydrolyzing the latter compound with an aqueous organic acid to produce the corresponding 17α,21 - dihydroxyspiro[pregn-4-ene-6,1'-cyclopropane]-3-20-dione.

17. The process which comprises treating a 6α-(2'-hydroxyethyl) compound of the formula:

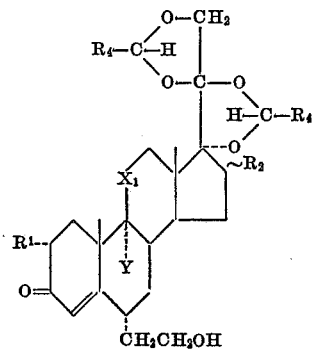

wherein $R_1$ is selected from the group consisting of hydrogen and methyl; $R_2$ is selected from the group consisting of hydrogen, methyl, fluorine, chlorine and methoxy; $R_4$ is selected from the group consisting of hydrogen and alkyl; $X_1$ is selected from the group consisting of $>CH_2$ and

Y is selected from the group consisting of hydrogen and fluorine; and wherein when $X_1$ is $>CH_2$, Y is limited to hydrogen; with an organic sulfonic acid halide and subjecting the 6α-(2'-organic sulfonyloxyethyl) derivative so obtained, to treatment under basic conditions to produce the corresponding 6,1'-spirocyclopropyl compound of the formula:

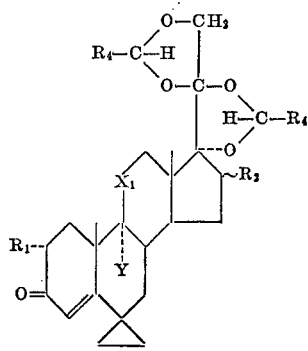

wherein $R_1$, $R_2$, $R_4$, $X_1$ and Y have the meanings given above.

18. The process which comprises treating a 6α-(2'-hydroxyethyl) compound of the formula:

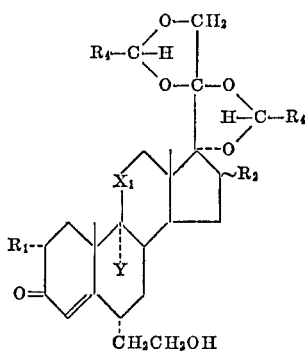

wherein $R_1$ is selected from the group consisting of hydrogen and methyl; $R_2$ is selected from the group consisting of hydrogen, methyl, fluorine, chlorine and methoxy; $R_4$ is selected from the group consisting of hydrogen and alkyl; $X_1$ is selected from the group consisting of $>CH_2$ and

Y is selected from the group consisting of hydrogen and fluorine; and wherein when $X_1$ is $>CH_2$, Y is limited to hydrogen; with an organic sulfonic acid halide and subjecting the 6α-(2'-organic sulfonyloxyethyl) derivative so obtained, to treatment under basic conditions to produce the corresponding 6,1'-spirocyclopropyl compound of the formula:

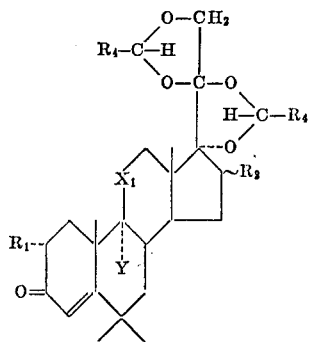

wherein $R_1$, $R_2$, $R_4$, $X_1$ and Y have the meanings given above, and hydrolyzing the latter compound with an aqueous organic acid to obtain the corresponding compound of the formula:

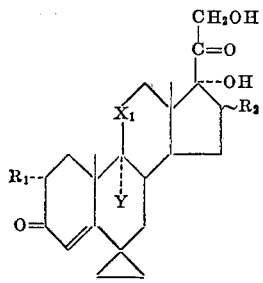

wherein $R_1$, $R_2$, $X_1$ and Y have the meanings given above.

19. The process which comprises treating a 6α-(2'-hydroxyethyl)-compound of the formula:

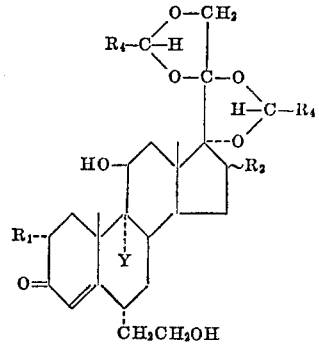

wherein $R_1$ is selected from the group consisting of hydrogen and methyl; $R_2$ is selected from the group consisting of hydrogen, methyl, fluorine, chlorine and methoxy; $R_4$ is selected from the group consisting of hydrogen and alkyl; and Y is selected from the group consisting of hydrogen and fluorine; with an organic sulfonic acid halide and subjecting the 6α-(2'-organic sulfonyloxyethyl) derivative so obtained to treatment under basic conditions to produce the corresponding 6,1'-spirocyclopropyl compound of the formula:

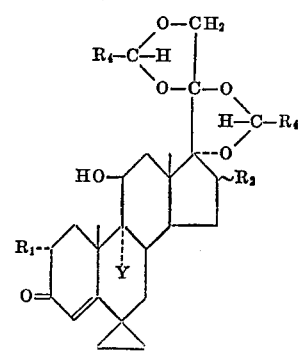

wherein $R_1$, $R_2$, $R_4$ and Y have the meanings given above, oxidizing the 6,1'-spirocyclopropyl compound thus obtained, with an oxidizing agent to produce the corresponding 11-oxo compound and hydrolyzing the latter compound with an aqueous organic acid to produce the corresponding compound of the formula:

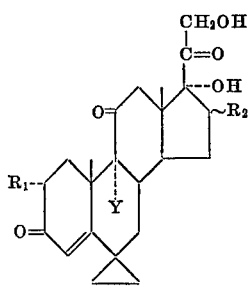

wherein $R_1$, $R_2$ and Y have the meanings given above.

20. The process which comprises treating 11β-hydroxy-6α - (2'-hydroxyethyl) - 17,20:20,21-bismethylenedioxy-pregn-4-en-3-one with p-toluenesulfonyl chloride in the presence of pyridine and treating the 11β-hydroxy-6α-(2'-tosyloxyethyl) - 17,20:20,21 - bimethylenedioxypregn-4-en-3-one so obtained, with potassium tert-butoxide to produce 11β-hydroxy - 17,20:20,21-bismethylene-dioxyspiro [pregn-4-ene-6,1'-cyclopropane]-3-one.

21. The process which comprises treating 11β-hydroxy-6α - (2'-hydroxyethyl) - 17,20:20,21-bismethylenedioxy-pregn-4-en-3-one with p-toluenesulfonyl chloride in the presence of pyridine; treating the 11β-hydroxy-6α(2'-tosyloxyethyl) - 17,20:20,21 - bismethylenedioxypregn-4-en-3-one so obtained with potassium tert-butoxide to produce 17β-hydroxy - 17,20:20,21 - bismethylenedioxyspiro [pregn - 4-ene-6,1'-cyclopropane]-3-one, and hydrolyzing the latter compound with aqueous formic acid to obtain 11β,17α, 21 - trihydroxyspiro[pregn-4-ene-6,1'-cyclopropane]-3-20-dione.

22. The process which comprises treating 11β-hydroxy-6α - (2'-hydroxyethyl) - 17,20:20,21-bismethylenedioxy-pregn-4-en-3-one with p-toluenesulfonyl chloride in the presence of pyridine; treating the 11β-hydroxy-6α-(2'-tosyloxyethyl - 17,20:20,21-bismethylenedioxypregn - 4-en-3-one so obtained, with potassium tert-butoxide; oxidizing the 11β-hydroxy - 17,20:20,21 - bismethylenedioxyspiro[pregn-4-ene-6,1'-cyclopropane]-3-one so obtained with chromic acid to produce 17,20:20,21-bismethylene-dioxyspiro[pregn - 4-ene - 6,1'-cyclopropane]-3,11-dione and hydrolyzing the latter compound with aqueous formic acid to obtain 17α, 21-dihydroxyspiro[pregn-4-ene-6,1'-cyclopropane]-3-11,20-trione.

23. A compound of the formula

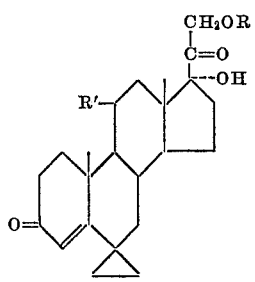

wherein R is selected from the group consisting of H and acetyl and R' is selected from the group consisting of keto and β-OH.

24. A compound of the formula

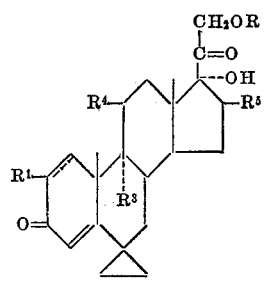

wherein

R is selected from the group consisting of hydrogen and acetyl;
$R^1$ is selected from the group consisting of hydrogen and alpha methyl;
$R^3$ is selected from the group consisting of hydrogen and fluoro;
$R^4$ is selected from the group consisting of hydroxy and keto;
$R^5$ is selected from the group consisting of hydrogen, alpha fluoro, and alpha and beta methyl; and the dotted line between the 1 and 2-positions represents an optional double bond.

25. A compound of the formula

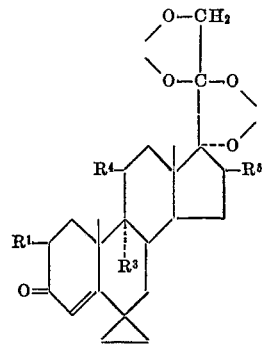

wherein
$R^1$ is selected from the group consisting of hydrogen and alpha methyl;
$R^3$ is selected from the group consisting of hydrogen and fluoro;
$R^4$ is selected from the group consisting of hydroxy and keto; and
$R^5$ is selected from the group consisting of hydrogen, alpha fluoro, and alpha and beta methyl.

26. A compound of the formula

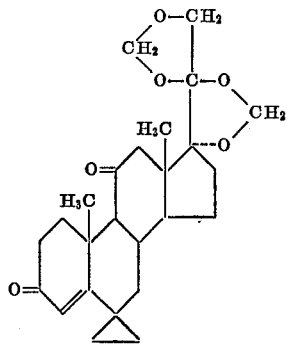

References Cited

UNITED STATES PATENTS 3,261,829    7/1966    Colton et al.

HENRY A. FRENCH, Primary Examiner

U.S. Cl. X.R.

195—51; 260—239.55, 397.45, 397.47, 999

UNITED STATES PATENT OFFICE
CERTIFICATE OF CORRECTION

Patent No. 3,475,417            Dated October 28, 1969

Inventor(s)  Norman A. Nelson

It is certified that error appears in the above-identified patent and that said Letters Patent are hereby corrected as shown below:

Column 42, line 30, claim 25, for

" 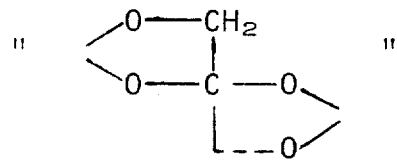 "

read

-- 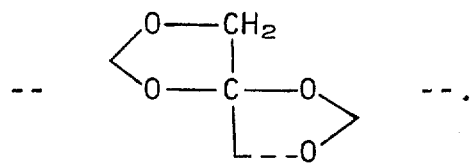 --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents